(12) United States Patent
Noble et al.

(10) Patent No.: US 7,367,018 B2
(45) Date of Patent: Apr. 29, 2008

(54) SYSTEM AND METHOD FOR ORGANIZING AND SHARING OF PROCESS PLANT DESIGN AND OPERATIONS DATA

(75) Inventors: Robert G. Noble, Cambridge (GB); Douglas M. Laing, Wellesley, MA (US); Andrew McBrien, Andover, MA (US); Peter Ward, Cambridge (GB)

(73) Assignee: Aspen Technology, Inc., Cambridge, MA (US)

( * ) Notice: Subject to any disclaimer, the term of this patent is extended or adjusted under 35 U.S.C. 154(b) by 832 days.

(21) Appl. No.: 10/692,006

(22) Filed: Oct. 23, 2003

(65) Prior Publication Data
US 2004/0133290 A1    Jul. 8, 2004

Related U.S. Application Data

(60) Provisional application No. 60/421,630, filed on Oct. 25, 2002.

(51) Int. Cl.
*G06F 9/44* (2006.01)
*G06F 17/00* (2006.01)

(52) U.S. Cl. .................. 717/120; 717/104; 700/90
(58) Field of Classification Search ........ 717/100–105, 717/120–123; 700/90, 105
See application file for complete search history.

(56) References Cited

U.S. PATENT DOCUMENTS

| 4,907,167 | A | * | 3/1990 | Skeirik | 700/10 |
| 4,910,691 | A | * | 3/1990 | Skeirik | 706/45 |
| 4,965,742 | A | * | 10/1990 | Skeirik | 700/86 |
| 5,006,992 | A | * | 4/1991 | Skeirik | 706/58 |
| 5,572,733 | A | * | 11/1996 | Ryu et al. | 717/104 |
| 5,581,459 | A | * | 12/1996 | Enbutsu et al. | 700/32 |
| 5,666,297 | A | * | 9/1997 | Britt et al. | 703/18 |
| 5,727,127 | A | * | 3/1998 | Schulze Horn et al. | 706/52 |
| 5,845,119 | A | * | 12/1998 | Kozuka et al. | 717/107 |
| 6,041,263 | A | * | 3/2000 | Boston et al. | 700/32 |

(Continued)

OTHER PUBLICATIONS

Hofmann, Claus, "A multi tier framework for accessing distributed, heterogeneous spatial data in a federation based EIS," 1999, ACM, p. 140-145.*

(Continued)

*Primary Examiner*—Wei Zhen
*Assistant Examiner*—Qing Chen
(74) *Attorney, Agent, or Firm*—Hamilton, Brook, Smith & Reynolds PC

(57) ABSTRACT

Computer method and apparatus for managing process and plant engineering data for chemical or other engineering processes across applications. The method and apparatus include a respective class view for each of multiple software applications, a composite class view, a conceptual data model and a resulting consolidated multi-tier data model. The multi-tier data model enables sharing of engineering and other data from the multiple software applications with other process and plant engineering applications and programs. An amalgamator synthesizes the class views, composite views and conceptual data model into the multi-tier data model. In forming the multi-tier data model, there is a one-to-one mapping between an attribute in the class view and composite class view, and a one-to-one mapping between an attribute in the composite class view and a data path in the conceptual data model to corresponding software applications from which the attribute originated.

20 Claims, 48 Drawing Sheets

U.S. PATENT DOCUMENTS

| | | | |
|---|---|---|---|
| 6,148,438 A * | 11/2000 | Schmit | 717/137 |
| 6,404,445 B1 * | 6/2002 | Galea et al. | 715/853 |
| 6,496,202 B1 * | 12/2002 | Prinzing | 715/762 |
| 6,854,107 B2 * | 2/2005 | Green et al. | 717/117 |
| 6,892,234 B2 * | 5/2005 | Knight | 709/223 |
| 6,931,621 B2 * | 8/2005 | Green et al. | 717/100 |
| 7,047,518 B2 * | 5/2006 | Little et al. | 717/108 |
| 7,206,646 B2 * | 4/2007 | Nixon et al. | 700/83 |
| 2002/0123864 A1 * | 9/2002 | Eryurek et al. | 702/188 |
| 2002/0161940 A1 * | 10/2002 | Eryurek et al. | 710/15 |
| 2003/0028268 A1 * | 2/2003 | Eryurek et al. | 700/73 |
| 2005/0198614 A1 * | 9/2005 | Mavashev et al. | 717/102 |

OTHER PUBLICATIONS

Stonebraker, Michael, "Too Much Middleware," 2002, ACM, p. 97-106.*

D. Tsichritzis and A. Klug, editors, "The ANSI/X3/SPARC DBMS Framework Report of the Study Group on Database Management Systems," *Inform. Systems* vol. 3, pp. 173-191, Pergamon Press, 1978.

* cited by examiner

| Class 'ShellAndTubeHeatExchanger' | | | | |
|---|---|---|---|---|
| Name 42 | Type 44 | Quantity Type 46 | Source 48 |
| DefaultSymbol | String | | ShellAndTubeHeatExchanger |
| Type | String | | ShellAndTubeHeatExchanger |
| TEMAClass | eTemaClass(ShellAndTubeHeatExchanger) | | ShellAndTubeHeatExchanger |
| TEMAType | String | | ShellAndTubeHeatExchanger |
| TEMARemarks | String | | ShellAndTubeHeatExchanger |
| TEMAOrientation | eTemaOrientation_PIP_VEDST003 | | ShellAndTubeHeatExchanger |
| AdditionalRemarks | String | | ShellAndTubeHeatExchanger |
| ⊟ Assemblies | ShellAndTubeAssembly | | ShellAndTubeHeatExchanger |
| ⊞ Bundle | ExchangerBundle | | ShellAndTubeAssembly |
| ⊞ Ends | ExchangerEnd | | ShellAndTubeAssembly |
| ⊞ Channel | ExchangerChannel | | ShellAndTubeAssembly |
| ⊞ Gasket | Gasket | | ShellAndTubeAssembly |
| ⊞ Piping | ExchangerPiping | | ShellAndTubeAssembly |
| ⊟ ShellSide | ExchangerShell | | ShellAndTubeAssembly |
| ⊞ Shell | Shell | | ExchangerShell |
| NumberShellPasses | Integer | | ExchangerShell |
| BodyFlangeType | eBodyFlangeType(ExchangerShell) | | ExchangerShell |
| ⊞ BodyFlangeMaterial | ConstructionMaterial | | ExchangerShell |
| ⊞ ExternalBoltingMaterial | ConstructionMaterial | | ExchangerShell |
| ⊞ InternalBoltingMaterial | ConstructionMaterial | | ExchangerShell |
| ⊞ NozzleFlangeMaterial | ConstructionMaterial | | ExchangerShell |

FIG. 3A

| | | | |
|---|---|---|---|
| ⊞ NozzleNeckMaterial | ConstructionMaterial | | ExchangerShell |
| ⊞ NozzleReinforcementMaterial | ConstructionMaterial | | ExchangerShell |
| ⊞ PipeAndStubEndMaterial | ConstructionMaterial | | ExchangerShell |
| CoverType | eShellCoverType(ExchangerShell) | | ExchangerShell |
| ⊞ CoverMaterial | ConstructionMaterial | | ExchangerShell |
| TemaShellType | eShellTEMAType | | ExchangerShell |
| InnerDiameter | Real | Length normal | ExchangerShell |
| OrientationAngle | Real | Plane angle POT | ExchangerShell |
| OuterDiameter | Real | Length normal | ExchangerShell |
| RearSupportPlateType | String | | ExchangerShell |
| Thickness | Real | Length small | ExchangerShell |
| VerticalHeight | Real | Length normal | ExchangerShell |
| EffectiveArea | Real | Area normal | ExchangerShell |
| TotalArea | Real | Area normal | ExchangerShell |
| AverageMetalTemperature | Real | Temperature tmp | ExchangerShell |
| ⊞ Velocities | ExchangerFluidVelocity | | ExchangerShell |
| ExpansionJointRequired | Boolean | | ExchangerShell |
| ⊞ ExpansionJoints | ExpansionJoint | | ExchangerShell |
| ⊞ FrontEndVapourBelt | VapourBelt | | ExchangerShell |
| ⊞ RearEndVapourBelt | VapourBelt | | ExchangerShell |
| KettleInnerDiameter | Real | Length normal | ExchangerShell |
| KettleInnerDiameter | Real | Length normal | ExchangerShell |
| KettlePortAngle | Real | Plane angle POT | ExchangerShell |

| 32 | | | |
|---|---|---|---|
| KettlePortLength | Real | Length normal | ExchangerShell |
| KettleType | eKettleType(ExchangerShell) | | ExchangerShell |
| ⊞ ChannelMaterial | ConstructionMaterial | | ExchangerShell |
| ⊞ ChannelCoverMaterial | ConstructionMaterial | | ExchangerShell |
| ⊞ FloatingHeadCoverMaterial | ConstructionMaterial | | ExchangerShell |
| ⊞ Lining | ConstructionMaterial | | ExchangerShell |
| ⊞ Gasket | Gasket | | ExchangerShell |
| InletAtChannelEnd | Boolean | | ExchangerShell |
| NumberCondensateNozzles | Integer | | ExchangerShell |
| NumberInletNozzles | Integer | | ExchangerShell |
| NumberIntermediateNozzles | Integer | | ExchangerShell |
| NumberLiquidOnlyOutletNozzles | Integer | | ExchangerShell |
| NumberOutletNozzles | Integer | | ExchangerShell |
| NumberVapourOnlyOutletNozzles | Integer | | ExchangerShell |
| InletNozzleLocation | eInletNozzleLocation(ExchangerShell) | | ExchangerShell |
| MechanicalCleaning | String | | ExchangerShell |
| EntranceConstruction | eEntranceConstruction(ExchangerShell) | | ExchangerShell |
| ExitConstruction | eExitConstruction(ExchangerShell) | | ExchangerShell |
| ⊞ MassBalanceIn | UoPort | | ExchangerShell |
| ⊞ MassBalanceOut | UoPort | | ExchangerShell |
| MaximumHydrogenPartialPressure | Real | Pressure abs | ExchangerSide |
| MaximumH2sPartialPressure | Real | Pressure abs | ExchangerSide |
| NumberOfPasses | Integer | | ExchangerSide |

FIG. 3C

| | | | |
|---|---|---|---|
| Remarks | String | | MechanicalComponent |
| NamePrecedent | String | | MechanicalComponent |
| ApplicableTo | eApplicableTo(ProcessPlantEquipment) | | ProcessPlantEquipment |
| DefaultSymbol | String | | ProcessPlantEquipment |
| ConstructionStatus | eConstructionStatus | | ProcessPlantEquipment |
| NamePrecedent | String | | ProcessPlantEquipment |
| ⊞ MaterialPorts | MaterialPort | | ProcessPlantEquipment |
| ⊞ SignalPorts | SignalPort | | ProcessPlantEquipment |
| EquipmentFunction | String | | ProcessPlantEquipment |
| Manufacturer | String | | ProcessPlantEquipment |
| PurchasedCapitalCost | Real | Currency | ProcessPlantEquipment |
| DeliveredCapitalCost | Real | Currency | ProcessPlantEquipment |
| InstalledCapitalCost | Real | Currency | ProcessPlantEquipment |
| NumberOfSpares | Integer | | ProcessPlantEquipment |
| NumberInService | Integer | | ProcessPlantEquipment |
| NumberRequired | Integer | | ProcessPlantEquipment |
| PidNumber | String | | ProcessPlantEquipment |
| Size | String | | ProcessPlantEquipment |
| Function | String | | ProcessPlantEquipment |
| OperatingFactor | String | | ProcessPlantEquipment |
| Model | String | | ProcessPlantEquipment |
| SerialNumber | String | | ProcessPlantEquipment |
| ManufacturersSerialNumber | String | | ProcessPlantEquipment |

FIG. 3D

| | | |
|---|---|---|
| FabricationSerialNumber | String | ProcessPlantEquipment |
| OperationMode | eOperationMode(MechanicalEquipment) | ProcessPlantEquipment |
| ⊞ MaterialSchedule | ConstructionMaterial | ProcessPlantEquipment |
| ⊞ ShippingRequirements | ShippingRequirements | ProcessPlantEquipment |
| ⊞ Location | Location | ProcessPlantEquipment |
| ⊞ NoiseSpecification | NoiseSpecification | ProcessPlantEquipment |
| ⊞ SpaceRequired | SpaceRequirement | ProcessPlantEquipment |
| ⊞ InspectionAndTests | InspectionAndTests | ProcessPlantEquipment |
| ⊞ DesignCodes | DesignCode | ProcessPlantEquipment |
| ⊞ SpareParts | SpareParts | ProcessPlantEquipment |
| ⊞ Weights | Weights | ProcessPlantEquipment |
| ⊞ Represents | ProcessUnitOperation | ProcessPlantEquipment |
| ⊞ NormalOperatingCriteria | OperatingCriteria | ProcessPlantEquipment |
| ⊞ MaximumOperatingCriteria | OperatingCriteria | ProcessPlantEquipment |
| ⊞ MinimumOperatingCriteria | OperatingCriteria | ProcessPlantEquipment |
| ⊞ NormalContents | MaterialAmountSpecification | ProcessPlantEquipment |
| ⊞ NormalContents | MaterialAmountSpecification | ProcessPlantEquipment |
| ⊞ MinimumContents | MaterialAmountSpecification | ProcessPlantEquipment |
| ⊞ MaximumContents | MaterialAmountSpecification | ProcessPlantEquipment |
| ManufacturerAddress1 | String | ProcessPlantEquipment |
| ManufacturerAddress2 | String | ProcessPlantEquipment |
| ManufacturerPhone | String | ProcessPlantEquipment |
| Fabricator | String | ProcessPlantEquipment |
| FabricatorAddress1 | String | ProcessPlantEquipment |

FIG. 3E

| | | |
|---|---|---|
| FabricatorAddress2 | String | ProcessPlantEquipment |
| FabricatorPhone | String | ProcessPlantEquipment |
| SuppliedBy | ePurchaserOrManufacturer | ProcessPlantEquipment |
| MountedBy | ePurchaserOrManufacturer | ProcessPlantEquipment |
| ModelNumber | String | ProcessPlantEquipment |
| ApplicableStandard | String | ProcessPlantEquipment |
| Orientation | String | ProcessPlantEquipment |
| ⊞ Customer | ProcessPlantCorporation | ProcessPlantEquipment |
| JobNumber | String | ProcessPlantEquipment |
| PoNumber | String | ProcessPlantEquipment |
| PoDate | String | ProcessPlantEquipment |
| InquiryBy | String | ProcessPlantEquipment |
| InquiryNumber | String | ProcessPlantEquipment |
| SpecificationNumber | String | ProcessPlantEquipment |
| RequisitionNumber | String | ProcessPlantEquipment |
| SAPNumber | String | ProcessPlantEquipment |
| ⊞ MaximumUtilities | SiteUtilityService | ProcessPlantEquipment |
| ⊞ MinimumUtilities | SiteUtilityService | ProcessPlantEquipment |
| ⊞ Utilities | SiteUtilityService | ProcessPlantEquipment |
| ⊞ UtilitySummary | UtilitySummary | ProcessPlantEquipment |

FIG. 3F

| | | |
|---|---|---|
| ⊞ PaintSpecifications | PaintSpecifications | ProcessPlantEquipment |
| Mounting | Boolean | ProcessPlantEquipment |
| CostingReference | String | ProcessPlantEquipment |
| ⊞ CostData | Cost | ProcessPlantEquipment |
| ⊞ ControlEquipment | ControlEquipment | ProcessPlantEquipment |
| ⊞ Documentation | Documentation | ProcessPlantEquipment |
| ⊞ SupplierData | ProcessPlantCorporation | ProcessPlantEquipment |
| ⊞ CustomerData | ProcessPlantCorporation | ProcessPlantEquipment |
| ⊞ FabricatorData | ProcessPlantCorporation | ProcessPlantEquipment |
| ⊞ ManufacturerData | ProcessPlantCorporation | ProcessPlantEquipment |
| ⊞ Purchaser | ProcessPlantCorporation | ProcessPlantEquipment |
| Type | String | PlantItem |
| ItemNumber | String | PlantItem |
| ItemSequenceNumber | String | PlantItem |
| ItemSuffix | String | PlantItem |
| CompleteItemNumber | String | PlantItem |
| ⊞ Comments | Comment | PlantItem |
| Notes | String | PlantItem |
| Description | String | PlantItem |
| ⊞ NormalDesignCriteria | DesignCriteria | PlantItem |
| ⊞ MinimumDesignCriteria | DesignCriteria | PlantItem |
| ⊞ MaximumDesignCriteria | DesignCriteria | PlantItem |
| CaseName | String | PlantItem |
| ⊞ MaterialConstruction | ConstructionMaterial | PlantItem |

| | 32 | | |
|---|---|---|---|
| ⊞ Insulation | ConstructionMaterial | | PlantItem |
| ⊞ Insulation | ConstructionMaterial | | PlantItem |
| ⊟ Nozzles | Nozzle | | PlantItem |
|    Entrance Type | eEntrancetype(Nozzle) | | Nozzle |
|    NozzleFunction | eNozzleFunction(Nozzle) | | Nozzle |
|    NozzleMark | String | | Nozzle |
|    Number | Integer | | Nozzle |
|    NozzleType | eType(Nozzle) | | Nozzle |
|    NozzleOrientation | Real | Plane Angle | Nozzle |
|    FlangeAndGasketByVendor | Boolean | | Nozzle |
|    FlangedOrStudded | eFlangedOrStuddedNozzle | | Nozzle |
|    DesignApprovalRequired | Boolean | | Nozzle |
|    DistanceFromCenter | Real | Length | Nozzle |
|    HeightUnderNozzle | Real | Length | Nozzle |
|    LocationRelativeToUbend | eLocationRelativeToUbend(Nozzle) | | Nozzle |
|    Position | ePosition(Nozzle) | | Nozzle |
|    Facing | eFacing(Nozzle) | | Nozzle |
| ⊞ Lining | ConstructionMaterial | | Nozzle |
|    Reinforced | String | | Nozzle |
|    Bore | Real | Length | Nozzle |
|    NominalSize | Real | Length | Nozzle |
|    OuterDiameter | Real | Length | Nozzle |
|    Rating | eRating(Nozzles) | | Nozzle |

| | | | |
|---|---|---|---|
| PressureRating | Real | Pressure | Nozzle |
| TemperatureRating | Real | Temperature | Nozzle |
| FlangeVelocity | Real | Velocity | Nozzle |
| PressureDrop | Real | PressureDiff | Nozzle |
| Rhov2 | Real | Density Velocity Sq | Nozzle |
| Velocity | Real | Velocity | Nozzle |
| AllowableForceAxial | Real | Force | Nozzle |
| AllowableForceHorizontal | Real | Force | Nozzle |
| AllowableForceVertical | Real | Force | Nozzle |
| AllowableMomentAxial | Real | Bending Moment(Torq | Nozzle |
| AllowableMomenHorizontal | Real | Bending Moment(Torq | Nozzle |
| AllowableMomenVertical | Real | Bending Moment(Torq | Nozzle |
| ⊞DistributorBelt | DistributorBelt | | Nozzle |
| ⊞Flange | Flange | | Nozzle |
| Flanged | eFlanged(Nozzle) | | Nozzle |
| ⊞Gasket | Gasket | | Nozzle |
| MatingPartsFurnished | Boolean | | Nozzle |
| ⊞NozzleDome | NozzleDome | | Nozzle |
| ⊞PipingTerminator | PipingTerminator | | Nozzle |
| VortexBreaker | Boolean | | Nozzle |
| Threaded | Boolean | | Nozzle |
| ThreadedParameterA | Real | Length | Nozzle |
| ThreadedParameterB | Real | Length | Nozzle |
| ThreadedParameterC | Real | Length | Nozzle |

FIG. 31

| | | |
|---|---|---|
| ThreadedParameterD | Real | |
| ThreadedParameterE | Real | |
| ⊞ LinePipeMaterial | ConstructionMaterial | Length |
| ⊞ ReinforcingPlateMaterial | ConstructionMaterial | Length |
| Remarks | String | |
| NamePrecedent | String | |
| ApplicableTo | eApplicableTo(ProcessPlantEquipment) | |

| | |
|---|---|
| | Nozzle |
| | Nozzle |
| | Nozzle |
| | Nozzle |
| | MechanicalComponent |
| | MechanicalComponent |
| | ProcessPlantEquipment |

| CompositeView 'ShellAndTubeHeatExchanger' | | | |
|---|---|---|---|
| Name | Type | Quantity Type | Route |
| AdditionalRemarks | String | | AdditionalRemarks |
| BaffleCut | Real | Percentage PQ | Assemblies.Bundle.Baffles.BaffleCut |
| BaffleCutOrientation | String | | Assemblies.Bundle.Baffles.Orientation |
| BaffleCutType | String | | |
| BafflePercentageCutForAreaBasis | Real | Percentage | Assemblies.Bundle.Baffles.PercentAreaCut |
| BafflePercentageCutForShellInnerDiameter | Real | Percentage | Assemblies.Bundle.Baffles.PercentDiameterFirstCut |
| BafflePitch | Real | Length normal | Assemblies.Bundle.Baffles.Pitch |
| BafflePitchMaximum | Real | Length small | |
| BafflesAndSupportPlates | String | | Assemblies.Bundle.Baffles.MaterialOfConstrucion.MaterialName |
| BaffleShellDiametralClearance | Real | Length normal | Assemblies.Bundle.Baffle.BaffleToShellClearance |
| BafflesMaterial | String | | Assemblies.Bundle.Baffle.MaterialOfConstruction.MaterialName |
| BafflesNumber | Integer | | Assemblies.Bundle.NumberOfBaffles |
| BafflesNumberAllowable | String | | |
| BafflesNumberMinimize | Boolean | | |
| BaffleSpacing | Real | Length | Assemblies.Bundle.NominalBaffleSpacing |
| BaffleSpacingFromInlet | Real | Length | Assemblies.Bundle.Tubesheets(1).DistanceFromFrontTubeSheetFace |
| BaffleSpacingFromOutlet | Real | Length small | |
| BaffleSpacingMaximum | Real | Length small | |
| BaffleSpacingMinimum | Real | | |
| BafflesPresent | String | | |
| BaffleSpacersTieRodsCorrosionAllowance | Real | Length small | Assemblies.Bundle.Tubesheets(1).TieRods.MaterialOfConstruction.CorrosionAllowance |

| | | | |
|---|---|---|---|
| BaffleSpacersTieRodsMaterial | String | | Assemblies.Bundle.Tubesheets(1).TieRods.MaterialOfConstruction.MaterialName |
| BaffleThickness | Real | Length small | Assemblies.Bundle.Baffles.Thickness |
| BaffleType | eType(ExchangerBaffle) | | Assemblies.Bundle.Baffles.BaffleType |
| BundleDiameter | Real | Length | |
| BundleEntranceRv2 | Real | Density Velocity Sq | Assemblies.PerformanceCriteria.ShellsidePerformance.BundleEntraceRhov2 |
| BundleExitRv2 | Real | Density Velocity Sq | Assemblies.PerformanceCriteria.ShellsidePerformance.BundleExitRhov2 |
| BundleFirstTubeRowToInletDistance | Real | Length small | |
| BundleLastTubeRowToOutletDistance | Real | Length small | |
| BundleOuterDiameterMaximum | Real | Length (m) | Assemblies.Bundle.MaximumDesignCriteria(1).BundleOuterDiameter |
| BundleShellDiameterClearance | Real | Length small | |
| BundleWeight | Real | Mass | Assemblies.Bundle.Weights.TotalOperating |
| BundleNormalOrFull | String | | |
| BypassSealRequired | Boolean | | Assemblies.Bundle.BypassSeal.BypassSealRequired |
| BypassSealType | String | | Assemblies.Bundle.BypassSeal.SealType |
| ChannelBodyFlangeMaterial | String | | Assemblies.Channel.BodyFlangeMaterial.MaterialName |
| ChannelBodyFlangesCorrosionAllowance | Real | Length small | Assemblies.Channel.BodyFlangeMaterial.CorrosionAllowance |
| ChannelCorrosionAllowance | Real | Length small | Assemblies.Channel.ChannelMaterial.CorrosionAllowance |
| ChannelCoverCorrosionAllowance | Real | Length small | Assemblies.Channel.CoverMaterial.CorrosionAllowance |
| ChannelCoverMaterial | String | | Assemblies.Channel.CoverMaterial.MaterialName |
| ChannelExitInsulationMaterial | String | | Assemblies.Channel.ExitInsulationMaterial.MaterialName |
| ChannelExitInsulationThickness | Real | Length small | Assemblies.Channel.ExitInsulationMaterial.Thickness |
| ChannelExternalBoltingCorrosionAllowance | Real | Length small | Assemblies.Channel.ExternalBoltingMaterial.CorrosionAllowance |
| ChannelExternalBoltingMaterial | String | | Assemblies.Channel.ExternalBoltingMaterial.MaterialName |
| ChannelHeadCorrosionAllowance | Real | Length small | Assemblies.Channel.CoverMaterial.CorrosionAllowance |

FIG. 4B

| | | |
|---|---|---|
| ChannelHeadMaterial | String | Assemblies.Channel.CoverMaterial.MaterialName |
| ChannelInletInsulationMaterial | String | Assemblies.Channel.InletInsulationMaterial.MaterialName |
| ChannelInletInsulationThickness | Real | Length small | Assemblies.Channel.InletInsulationMaterial.Thickness |
| ChannelInternalBoltingCorrosionAllowance | Real | Length small | Assemblies.Channel.InletInsulationMaterial.CorrosionAllowance |
| ChannelInternalBoltingMaterial | String | Assemblies.Channel.InternalBoltingMaterial.MaterialName |
| ChannelMaterial | String | Assemblies.Channel.ChannelMaterial.MaterialName |
| ChannelNozzleFlangeMaterial | String | Assemblies.Channel.NozzleFlangeMaterial.MaterialName |
| ChannelNozzleFlangeCorrosionAllowance | Real | Length small | Assemblies.Channel.NozzleFlangeMaterial.CorrosionAllowance |
| ChannelNozzleNeckMaterial | String | Assemblies.Channel.NozzleNeckMaterial.MaterialName |
| ChannelNozzleNecksCorrosionAllowance | Real | Length small | Assemblies.Channel.NozzleNeckMaterial.CorrosionAllowance |
| ChannelNozzleReinforcementMaterial | Real | Length small | Assemblies.Channel.NozzleReinforcementMaterial.CorrosionAllowance |
| ChannelNozzleReinforcementMaterial | String | Assemblies.Channel.NozzleReinforcementMaterial.MaterialName |
| ChannelPipeandstubEndsCorrosionAllowance | Real | Length small | Assemblies.Channel.PipeAndStubEndsMaterial.CorrosionAllowance |
| ChannelPipeandstubEndsMaterial | String | Assemblies.Channel.PipeAndStubEndsMaterial.MaterialName |
| CodeRequirements | String | AsmeCode |
| ColdInletStream | MaterialFlowSpecification | MaterialPorts[ThermalAllocation="ColdIn"].Flow |
| ColdOutletStream | MaterialFlowSpecification | MaterialPorts[ThermalAllocation="ColdOut"].Flow |
| ColdSideDesignPressure | Real | Pressure abs | ColdSide.NormalDesignCriteria.Pressure |
| ColdSideDesignTemperature | Real | Temperature tmp | ColdSide.NormalDesignCriteria.Temperature |
| ColdSideFlangeFacing | String | ColdSide.FlangeFacing |
| ColdSideFlangeRating | String | ColdSide.FlangeRating |
| ColdSideFluidAllocation | eHotFluidAllocation(Shel | NormalDesignCriteria(1).ColdFluidAllocation |
| ColdSideFluidName | String | MaterialPorts[ThermalAllocation="ColdIn"].Flow.Name |
| ColdSideFoulingResistance | Real | Thermal Resistance | ColdSide.FoulingResistance |

| | | | |
|---|---|---|---|
| ColdSideFoulingThickness | Real | Length small | ColdSide.FoulingThickness |
| ColdSideFullVacuum | Boolean | | ColdSide.NormalDesignCriteria.FullVacuum |
| ColdSideGasketMaterial | String | | |
| ColdSideHeatBalanceMethod | String | | |
| ColdSideHeatCurves | ExchangerFluidProfile | | ColdSide.FluidProfiles(*) |
| ColdSideInletEnthalpyMassBasis | Real | Enthalpy | MaterialPorts[ThermalAllocation="ColdIn"].Flow.BulkFlow.EnthalpyMassBasis |
| ColdSideInletH2MoleConcentration | Real | Condentm(Mol/Mol) | MaterialPorts[ThermalAllocation="ColdIn"].Flow.BulkFlow.DefinedPointPhysicalProperties.Hydrog |
| ColdSideInletH2SMoleConcentration | Real | Condentm(Mol/Mol) | MaterialPorts[ThermalAllocation="ColdIn"].Flow.BulkFlow.DefinedPointPhysicalProperties.Hydrog |
| ColdSideInletInertMW | Real | Molar Mass(g/mol) | MaterialPorts[ThermalAllocation="ColdIn"].Flow.NonCondensibles.MolecularWeight |
| ColdSideInletMassQuality | Real | Fraction | MaterialPorts[ThermalAllocation="ColdIn"].Flow.VapourPhaseMassFraction |
| ColdSideInletPressure | Real | Pressure abs | MaterialPorts[ThermalAllocation="ColdIn"].Flow.BulkFlow.Pressure |
| ColdSideInletTemperature | Real | Temperature tmp | MaterialPorts[ThermalAllocation="ColdIn"].Flow.BulkFlow.Temperature |
| ColdSideInletVaporH2MFLOW | Real | Mass flow normal | MaterialPorts[ThermalAllocation="ColdIn"].Flow.VapourPhaseDefinedPointPhysicalProperties.Hy |
| ColdSideInletVaporH2MW | Real | Molar Mass(g/mol) | MaterialPorts[ThermalAllocation="ColdIn"].Flow.VapourPhaseDefinedPointPhysicalProperties.Hy |
| ColdSideInletVaporH2OMW | Real | Molar Mass(g/mol) | MaterialPorts[ThermalAllocation="ColdIn"].Flow.VapourPhaseDefinedPointPhysicalProperties.H2 |
| ColdSideInletVaporHydrocarbonMassFlow | Real | Mass flow normal | MaterialPorts[ThermalAllocation="ColdIn"].Flow.VapourPhaseDefinedPointPhysicalProperties.Hy |
| ColdSideInletVaporHydrocarbonMW | Real | Molar Mass(g/mol) | MaterialPorts[ThermalAllocation="ColdIn"].Flow.VapourPhaseDefinedPointPhysicalProperties.Hy |
| ColdSideLiquidHeatTransferCoefficientSpecified | Real | Heat Transfer Coef | |
| ColdSideMassFlow | Real | Mass flow normal | MaterialPorts[ThermalAllocation="ColdIn"].Flow.BulkFlow.MassFlowRate |
| ColdSideMolecularWeight | Real | Molar Mass | MaterialPorts[ThermalAllocation="ColdIn"].Flow.BulkFlow.MolecularWeight |
| ColdSideOutletEnthalpyMassBasis | Real | Enthalpy | MaterialPorts[ThermalAllocation="ColdOut"].Flow.BulkFlow.EnthalpyMassBasis |
| ColdSideOutletH2MoleConcentration | Real | Condentm(Mol/Mol) | MaterialPorts[ThermalAllocation="ColdOut"].Flow.BulkFlow.DefinedPointPhysicalProperties.Hydrog |
| ColdSideOutletH2SMoleConcentration | Real | Condentm(Mol/Mol) | MaterialPorts[ThermalAllocation="ColdOut"].Flow.BulkFlow.DefinedPointPhysicalProperties.H2sMo |
| ColdSideOutletInertMW | Real | Molar Mass(g/mol) | MaterialPorts[ThermalAllocation="ColdOut"].Flow.NonCondesibles.MolecularWeight |

FIG. 4D

| | | |
|---|---|---|
| ColdSideOutletMassQuality | Real | Fraction | MaterialPorts[ThermalAllocation="ColdOut"].Flow.VapourPhase.MassFraction |
| ColdSideOutletPressure | Real | Pressure, abs | MaterialPorts[ThermalAllocation="ColdOut"].Flow.BulkFlow.Pressure |
| ColdSideOutletTemperature | Real | Temperature tmp | MaterialPorts[ThermalAllocation="ColdOut"].Flow.BulkFlow.Temperature |
| ColdSideOutletVaporH2MassFlow | Real | Mass flow normal | MaterialPorts[ThermalAllocation="ColdOut"].Flow.VapourPhaseDefinedPoint.PhysicalProperties.H |
| ColdSideOutletVaporH2MW | Real | Molar Mass(g/mol) | MaterialPorts[ThermalAllocation="ColdOut"].Flow.VapourPhaseDefinedPoint.PhysicalProperties.H |
| ColdSideOutletVaporH2OMW | Real | Molar Mass(g/mol) | MaterialPorts[ThermalAllocation="ColdOut"].Flow.VapourPhaseDefinedPoint.PhysicalProperties.H |
| ColdSideOutletVaporHydrocarbonMassFlow | Real | Mass flow normal | MaterialPorts[ThermalAllocation="ColdOut"].Flow.VapourPhaseDefinedPoint.PhysicalProperties.H |
| ColdSideOutletVaporHydrocarbonMW | Real | Molar Mass(g/mol) | MaterialPorts[ThermalAllocation="ColdOut"].Flow.VapourPhaseDefinedPoint.PhysicalProperties.H |
| ColdSidePhaseIndicator | eForm(MaterialFlowSpe | | MaterialPorts[ThermalAllocation="ColdOut"].Flow.Form |
| ColdSidePressureDrop | Real | Pressure Diff | ColdSide.NormalOperatingCriteria.PressureDrop |
| ColdSidePressureDropAllowable | Real | Pressure Diff | ColdSide.MaximumDesignCriteria.AllowablePressureDrop |
| ColdSidePressureDropInNozzlesAllowable | Real | | |
| ColdSideTestPressure | Real | Pressure abs | |
| ColdSideTestPressure | Real | Pressure abs | |
| ColdSideTwoPhaseHeatTransferCoefficientSpecified | Real | Heat Transfer Coef | |
| ColdSideVacuumPressure | Real | Pressure vacuum | |
| ColdSideVacuumReferenceTemperature | Real | Temperature tmp | ColdSide.NormalDesignCriteria.VacuumTemperature |
| ColdSideVapourHeatTransferCoefficientSpecified | Real | Heat Transfer Coef | |
| ColdSideVelocityMaximumAllowable | Real | Velocity normal | |
| ColdSideVelocityMinimumAllowable | Real | Velocity normal | |
| ConnectionDescription | String | | Nozzles(*).Description |
| ConnectionFacing | eFacing(Flange) | | Nozzles(*).Flange.Facing |
| ConnectionMark | String | | Nozzles(*).NozzleMark |
| ConnectionNumberRequired | Integer | | Nozzles(*).NumberRequired |

FIG. 4E

| | | | |
|---|---|---|---|
| ConnectionRating | eRating(Nozzle) | | Nozzles(*),Rating |
| ConnectionScheduleSize | Real | | Nozzles(*),NominalSize |
| CorrectedandweightedMtd | Real | Length | PerformanceCriteria,LmtdWeighted |
| Correctedmtd | Real | Temperature Diff | PerformanceCriteria,LmtdCorrected |
| CostingUserTag | String | Temperature Diff | CostData,UserTag |
| Customer | String | | Customer,AbbreviatedName |
| Description | String | | Description |
| DesignGuidelines | String | | DesignGuidelines(1) |
| DesignShellMeanMetalTemperature | Real | Temperature | Assemblies,ShellSide,Shell,NormalDesignCriteria(1),MetalTemperature |
| DesignShellPressure | Real | Pressure gauge | Assemblies,ShellSide,Shell,NormalDesignCriteria(1),Pressure |
| DesignTubeMeanMetalTemperature | Real | Temperature | Assemblies,Bundle,TubeType(1),NormalDesignCriteria(1),MetalTemperature |
| DesignTubePressure | Real | Pressure gauge | NormalDesignCriteria(1),Pressure |
| DesignTubeSheetMeanMetalTemperature | Real | Temperature | Assemblies,Bundle,Tubesheets(1),NormalDesignCriteria(1),MetalTemperature |
| DirectFieldCost | Real | Currency | CostData,DirectFieldCost |
| ExchangerIsDoublePipe | Boolean | | ExchangerIsDoublePipe |
| ExchangerType | String | | ExchangerType |
| ExchangerWeightEmpty | Real | Mass | Weights,Empty |
| ExchangerWeightFullOfWater | Real | Mass | Weights,WaterFilled |
| ExpansionJointDesignLifeCycles | Integer | | Assemblies,ShellSide,ExpansionJoints,DesignLifeCycles |
| ExpansionJointMaterial | String | | Assemblies,ShellSide,ExpansionJoints,MaterialOfConstruction,MaterialName |
| ExpansionJointRequired | Boolean | | Assemblies,ShellSide,ExpansionJoints,Required |
| ExpansionJointType | eType(ExpansionJoint) | | Assemblies,ShellSide,ExpansionJoints,JointType |
| Fabricator | String | | Fabricator |
| FloatingHeadCoverBoltMaterial | String | | Assemblies,FloatingHead,CoverBoltMaterial,MaterialName |

FIG. 4F

| | | | |
|---|---|---|---|
| FloatingHeadCoverMaterial | String | | Assemblies,FloatingHead,CoverBoltMaterial,MaterialName |
| FloatingHeadGasketMaintenanceFactor | Real | Pressure abs | Assemblies,FloatingHead,Gasket,MaintenaceFactor |
| FloatingHeadGasketMaterial | String | | Assemblies,FloatingHead,Gasket,MaterialOfConstruction,MaterialName |
| FloatingHeadGasketThickness | Real | Length small | Assemblies,FloatingHead,Gasket,MaterialOfConstruction,Thickness |
| FloatingHeadGasketYFactor | Real | Pressure abs | Assemblies,FloatingHead,Gasket,MaterialOfConstruction,MaximumYieldStrength |
| FrontEndTemaType | eTemaType(ExchangeE | | Assemblies,Ends(1),TemaType |
| GasketsSpareSetsRequired | Integer | | Assemblies,Gasket,NumberOfSpares |
| GeneralOfficeOverhead | Real | Currency | CostData,GeneralOfficeOverhead |
| HeatExchanged | Real | Power normal | PerformanceCriteria,PerformanceData(I),HeatDuty |
| HeatTransferRateClean | Real | Heat Transfer Coef | PerformanceCriteria,OverallCoefficientClean |
| HeatTransferRateFouled | Real | Heat Transfer Coef | PerformanceCriteria,OverallCoefficientFouled |
| HeatTransferRateRequired | Real | Heat Transfer Coef | PerformanceCriteria,OverallHeatTransferCoefficient |
| HotInletStream | MaterialFlowSpecification | | MaterialPorts[ThermalAllocation="HotIn"],Flow |
| HotOutletStream | MaterialFlowSpecification | | MaterialPorts[ThermalAllocation="HotOut"],Flow |
| HotSideDesignPressure | Real | Pressure abs | HotSide,NormalDesignCriteria,Pressure |
| HotSideDesignTemperature | Real | Temperature tmp | HotSide,NormalDesignCriteria,Temperature |
| HotSideEnthalpy | Real | Enthalpy | HotSide,HeatingCoolingCurve(1),DataPoints(*),BulkFlow,ThermodynamicProperties,SpecificEntha |
| HotSideFlangeFacing | String | | HotSide,FlangeFacing |
| HotSideFlangeFacing | String | | HotSide,FlangeFacing |
| HotSideFlangeRating | String | | HotSide,FlangeRating |
| HotSideFluidAllocation | eHotFluidAllocation(Shel | | NormalDesignCriteria(1),HotFluidAllocation |
| HotSideFluidName | String | | MaterialPorts[ThermalAllocation="HotIn"],Flow,Name |
| HotSideFoulingResistance | Real | Thermresist POT | HotSide,FoulingResistance |
| HotSideFoulingThickness | Real | Lengthsmall | HotSide,FoulingThickness |

| | | | |
|---|---|---|---|
| HotSideFullVacuum | Boolean | | HotSide.NormalDesignCriteria.FullVacuum |
| HotSideFullVacuumReferenceTemperature | Real | Tempreature tmp | HotSide.NormalDesignCriteria.VacuumTemperature |
| HotSideGasketMaterial | String | | |
| HotSideHeatBalanceMethod | String | | |
| HotSideHeatCurves | ExchangerFluidProfile | | HotSide.FluidProfiles("*") |
| HotSideInletEnthalpyMassBasis | Real | Enthalpy | MaterialPorts[ThermalAllocation="HotIn"].Flow.BulkFlow.EnthalpyMassBasis |
| HotSideInlet2MoleConcentration | Real | Conc. % mol/mol | MaterialPorts[ThermalAllocation="HotIn"].Flow.BulkFlow.DefinedPoint.PhysicalProperties.Hydroge |
| HotSideInlet2SMoleConcentration | Real | Conc. % mol/mol | MaterialPorts[ThermalAllocation="HotIn"].Flow.BulkFlow.DefinedPoint.PhysicalProperties.H2sMole |
| HotSideInletInertMW | Real | MolarMass (g/mol) | MaterialPorts[ThermalAllocation="HotIn"].Flow.NonCondesibles.MolecularWeight |
| HotSideInletMassQuality | Real | Fraction | MaterialPorts[ThermalAllocation="HotIn"].Flow.VapourPhase.MassFraction |
| HotSideInletPressure | Real | Pressure abs | MaterialPorts[ThermalAllocation="HotIn"].Flow.BulkFlow.Pressure |
| HotSideInletTemperature | Real | Temperature tmp | MaterialPorts[ThermalAllocation="HotIn"].Flow.BulkFlow.Temperature |
| HotSideInletVaporFlowrate | Real | Mass flow small | MaterialPorts[ThermalAllocation="HotIn"].Flow.VapourPhase.MassFlowRate |
| HotSideInletVaporH2MassFlow | Real | Mass flow normal | MaterialPorts[ThermalAllocation="HotIn"].Flow.VapourPhase.DefinedPoint.PhysicalProperties.Hyd |
| HotSideInletVaporH2MW | Real | Molar Mass(g/mol) | MaterialPorts[ThermalAllocation="HotIn"].Flow.VapourPhase.DefinedPoint.PhysicalProperties.Hyd |
| HotSideInletVapor20MW | Real | Molar Mass (g/mol) | MaterialPorts[ThermalAllocation="HotIn"].Flow.VapourPhase.DefinedPoint.PhysicalProperties.Hyd |
| HotSideInletVaporHydrocarbonMassFlow | Real | Mass flow normal | MaterialPorts[ThermalAllocation="HotIn"].Flow.VapourPhase.DefinedPoint.PhysicalProperties.Hyd |
| HotSideInletVaporHydrocarbonMW | Real | Molar Mass(g/mol) | MaterialPorts[ThermalAllocation="HotIn"].Flow.VapourPhase.DefinedPoint.PhysicalProperties.Hyd |
| HotSideLiquidHeatTransferCoefficientSpecified | Real | Heat Transfer Coef | |
| HotSideMassFlow | Real | Mass flow normal | MaterialPorts[ThermalAllocation="HotIn"].Flow.BulkFlow.MassFlowRate |
| HotSideMolecularWeight | Real | Molar Mass | MaterialPorts[ThermalAllocation="HotIn"].Flow.BulkFlow.MolecularWeight |
| HotSideOutletEnthalpyMassBasis | Real | Enthalpy | MaterialPorts[ThermalAllocation="HotOut"].Flow.BulkFlow.EnthalpyMassBasis |
| HotSideOutletH2MoleConcentration | Real | Conc. % mol/mol | MaterialPorts[ThermalAllocation="HotOut"].Flow.BulkFlow.DefinedPointPhysicalProperties.Hydro |
| HotSideOutletH2SMoleConcentration | Real | Conc. % mol/mol | MaterialPorts[ThermalAllocation="HotOut"].Flow.BulkFlow.DefinedPointPhysicalProperties.H2sMo |

FIG. 4H

| | | | |
|---|---|---|---|
| HotSideOutletInertMW | Real | MolarMass (g/mol) | MaterialPorts[ThermalAllocation="HotOut"].Flow.NonCondesibles.MolecularWeight |
| HotSideOutletMassQuality | Real | Fraction | MaterialPorts[ThermalAllocation="HotOut"].Flow.VapourPhase.MassFraction |
| HotSideOutletPressure | Real | Pressure abs | MaterialPorts[ThermalAllocation="HotOut"].Flow.BulkFlow.Pressure |
| HotSideOutletTemperature | Real | Temperature | MaterialPorts[ThermalAllocation="HotOut"].Flow.BulkFlow.Temperature |
| HotSideOutletVaporH2MassFlow | Real | Mass flow normal | MaterialPorts[ThermalAllocation="HotOut"].Flow.VapourPhase.DefinedPoint.PhysicalProperties.Hy |
| HotSideOutletVaporH2MW | Real | Molar Mass(g/mol) | MaterialPorts[ThermalAllocation="HotOut"].Flow.VapourPhase.DefinedPoint.PhysicalProperties.Hyd |
| HotSideOutletVaporH20MW | Real | Molar Mass(g/mol) | MaterialPorts[ThermalAllocation="HotOut"].Flow.VapourPhase.DefinedPoint.PhysicalProperties.H2 |
| HotSideOutletVaporHydrocarbonMassFlow | Real | Mass flow normal | MaterialPorts[ThermalAllocation="HotOut"].Flow.VapourPhase.DefinedPoint.PhysicalProperties.Hy |
| HotSideOutletVaporHydrocarbonMW | Real | Molar Mass(g/mol) | MaterialPorts[ThermalAllocation="HotOut"].Flow.VapourPhase.DefinedPoint.PhysicalProperties.Hy |
| HotSidePhaseIndicator | eForm(MaterialFlowSpec | | MaterialPorts[ThermalAllocation="HotIn"].Flow.Form |
| HotSidePressureDrop | Real | Presure Diff | HotSide.NormalOperatingCriteria.PressureDrop |
| HotSidePressureDropAllowable | Real | Presure Diff | HotSide.MaximumDesignCriteria.AllowablePressureDrop |
| HotSidePressureDropInNozzlesAllowable | Real | | |
| HotSideTestPressure | Real | Pressure abs | |
| HotSideTwoPhaseHeatTransferCoefficientSpecif | Real | Heat Transfer Coef | |
| HotSideVacuumPressure | Real | Pressure vacuum | |
| HotSideVapourHeatTransferCoefficientSpecified | Real | Heat Transfer Coef | |
| HotSideVelocityMaximumAllowable | Real | Velocity normal | |
| HotSideVelocityMinimumAllowable | Real | Velocity normal | |
| HydroTestPressureField | Real | Absolute Pressure | InspectionsAndTests.HydrostaticTestPressureField |
| HydroTestPressureShop | Real | Absolute Pressure | InspectionsAndTests.HydrostaticTestPressureShop |
| ImpingementProtection | Boolean | | Assemblies.Bundle.ImpingementProtection |
| ImpingementProtectionType | ePlateType/Impingement | | Assemblies.Bundle.ImpingementPlate.PlateType |

| | | | |
|---|---|---|---|
| ImpingementProtectionType | ePlateType(Impingemen | | Assemblies.Bundle.ImpingementPlate.PlateType |
| InletNozzleRv2 | Real | Density Velocity Sq | Assemblies.PerformanceCriteria.ShellsidePerformance.LimitInletRhov2 |
| InnerDiameter | Real | Length normal | Assemblies.ShellSide.InnerDiameter |
| InsulationDensity | Real | Density | Insulation.Density |
| InsulationMaterial | String | | Insulation.MaterialName |
| InsulationPurpose | String | | Insulation.Purpose |
| InsulationSpecification | String | | Insulation.Specification |
| InsulationThickness | Real | Length small | Insulation.Thickness |
| ItemNumber | String | | ItemNumber |
| JobNo | String | | JobNumber |
| KettleDiameterInner | Real | Length small | |
| KettleDiameterOuter | Real | Length small | |
| Location | String | | Location.Site |
| LongditudinalBaffleSealType | eSealType(LongitudinalB | | Assemblies.Bundle.LongitudinalBaffles.SealType |
| LongditudinalBaffleType | String | | Assemblies.Bundle.LongitudinalBaffles.Type |
| Manufacturer | String | | Manufacturer |
| MaterialComponentCost | Real | Currency | CostData.MaterialComponentCost |
| MAWPCalculation | Boolean | | CalculateMAWP |
| MAWPHotAndCorroded | Real | Pressure abs | MAWPHotAndCorroded |
| MAWPNewAndCold | Real | Pressure abs | MAWPNewAndCold |
| ModelNumber | String | | ModelNumber |
| NormalShellMeanMetalTemperature | Real | Temperature | Assemblies.ShellSide.Shell.NormalDesignCriteria(1).MetalTemperature |
| NormalShellPressure | Real | Pressure gauge | NormalContent.BulkAmount.Pressure |
| NormalTubeMeanMetalTemperature | Real | Temperature | Assemblies.Bundle.TubeType(1).NormalDesignCriteria(1).MetalTemperature |

FIG. 4J

| | | |
|---|---|---|
| NormalTubePressure | Real | NormalContents,BulkAmount,Pressure |
| NormalTubeSheetMeanMetalTemperature | Real | Assemblies,Bundle,TubeType(1),NormalDesignCriteria(1),MetalTemperature |
| Notes | String | Notes(*) |
| NumberOfCrossPasses | Integer | Assemblies,Bundle,NumberOfCrosspasses |
| NumberOfUnits | Integer | NumberInService |
| NumberRequired | Integer | NumberRequired |
| Orientation | String | Orientation |
| PONumber | String | PoNumber |
| PressureShellDesignGuage | Real | NormalDesignCriteria(1),ShellsideDesign,Pressure |
| PressureTubeDesignGuage | Real | NormalDesignCriteria(1),ShellsideDesign,Pressure |
| PressureUnit | String | CompleteItemNumber |
| Profit | Real | CostData,Profit |
| QuotedCost | Real | CostData,QuotedCost |
| RearEndTemaType | eTemaTypeExchanger | Assemblies,Ends(2),TemaType |
| ReasonsForStressRelief | String | InspectionAndTests,ReasonsForStressRelief |
| RefNameIcanus | String | CostingReference |
| SealingStripNumberOfPairs | Integer | Assemblies,Bundle,NumberOfSealStrips |
| SealingStripTubeRowsPer | Real | |
| ServiceOfUnit | String | Function |
| ShellAndTubeOnEquipmentSpecification | Boolean | ShellAndTubeOnEquipmentSpecification |
| ShellAndTubeOnProcessSpecificSS | Boolean | ShellAndTubeOnProcessSpecificSS |
| ShellBodyFlangeCorrosionAllowance | Real | Length small | Assemblies,ShellSide,BodyFlangeMaterial,CorrosionAllowance |
| ShellBodyFlangeMaterial | String | Assemblies,ShellSide,BodyFlangeMaterial,MaterialName |
| ShellCorrosionAllowance | Real | Length Inches | NormalDesignCriteria(1),ShellsideDesign,AllowableCorrosionAllowance |

| | | | |
|---|---|---|---|
| ShellCoverMaterial | String | | Assemblies,ShellSide,CoverMaterial,MaterialName |
| ShellDiameterIncrements | Real | | NormalDesignCriteria,ShellsideDesign,ShallDiameterIncrement |
| ShellDiameterInner | Real | Length | Assemblies,ShellSide,Shell,InnerDiameter |
| ShellDiameterMaximum | Real | Length small | MaximumDesignCriteria,ShellsideDesign,MaximumShellDiameter |
| ShellDiameterMinimum | Real | Length small | NormalDesignCriteria(1),ShellsideDesign,AllowableCorrosionAllowance |
| ShellDiameterMinimum | Real | Length small | NormalDesignCriteria(1),ShellsideDesign,AllowableCorrosionAllowance |
| ShellDiameterOuter | Real | Length | Assemblies,ShellSide,OuterDiameter |
| ShellExpansionJoint | String | | Assemblies,ShellSide,Shell,ExpansionJoints,MaterialOfConstruction,MaterialName |
| ShellExpansionJointCorrosionAllowance | Real | Length | Assemblies,ShellSide,Shell,ExpansionJoints,MaterialOfConstruction,CorrosionAllowance |
| ShellExternalBoltingCorrosionAllowance | Real | Length small | Assemblies,ShellSide,Shell,ExternalBoltingMaterial,CorrosionAllowance |
| ShellExternalBoltingMaterial | String | | Assemblies,ShellSide,Shell,ExternalBoltingMaterial,MaterialName |
| ShellHeadCorrosionAllowance | Real | Length | Assemblies,ShellSide,Shell,Heads(1),MaterialOfConstruction,CorrosionAllowance |
| ShellHeadMaterial | String | | Assemblies,ShellSide,Shell,Heads(1),MaterialOfConstruction,MaterialName |
| ShellInternalBoltingCorrosionAllowance | Real | Length small | Assemblies,ShellSide,Shell,InternalBoltingMaterial,CorrosionAllowance |
| ShellInternalBoltingMaterial | String | | Assemblies,ShellSide,Shell,InternalBoltingMaterial,MaterialName |
| ShellMaterial | String | | Assemblies,ShellSide,Shell,MaterialOfConstruction,MaterialName |
| ShellMaterialClass | String | | Assemblies,ShellSide,Shell,MaterialOfConstruction,MaterialClass |
| ShellNozzleFlangeCorrosionAllowance | Real | Length small | Assemblies,ShellSide,Shell,NozzleFlangeMaterial,CorrosionAllowance |
| ShellNozzleFlangeMaterial | String | | Assemblies,ShellSide,Shell,NozzleFlangeMaterial,MaterialName |
| ShellNozzleNeckMaterial | String | | Assemblies,ShellSide,Shell,NozzleNeckMaterial,MaterialName |
| ShellNozzleNecksCorrosionAllowance | Real | Length small | Assemblies,ShellSide,Shell,NozzleNeckMaterial,CorrosionAllowance |
| ShellNozzleReinforementCorrosionAllowance | Real | Length | Assemblies,ShellSide,Shell,Nozzles(1),MaterialOfConstruction,CorrosionAllowance |
| ShellNozzleReinforementMaterial | String | | Assemblies,ShellSide,Shell,Nozzles(1),Reinforced |
| ShellPassesNumberPerShell | Integer | | Assemblies,ShellSide,Shell,NumberShellPasses |

| | | | |
|---|---|---|---|
| ShellPipeandStubEndCorrosionAllowance | Real | Length small | Assemblies,ShellSide,PipeAndStubEndMaterial,CorrosionAllowance |
| ShellPipeandStubEndMaterial | String | | Assemblies,ShellSide,PipeAndStubEndMaterial,MaterialName |
| ShellSideAverageFilmCoefficient | Real | Heat Transfer Coef | Assemblies,PerformanceCriteria,ShellsidePerformance,BulkFilmCoefficient |
| ShellSideCleaning | String | | Assemblies,ShellSide,MechanicalCleaning |
| ShellSideCorrosionAllowance | Real | Length | Assemblies,ShellSide,MaterialConstruction,CorrosionAllowance |
| ShellSideCrossflowFraction | Real | Fraction | |
| ShellSideDesignPressure | Real | Pressure gauge | Assemblies,ShellSide,NormalDesignCriteria(1),Pressure |
| ShellSideDesignPressureMaximum | Real | Pressure abs | Assemblies,ShellSide,MaximumDesignCriteria,Pressure |
| ShellSideDesignTemperature | Real | Temperature | Assemblies,ShellSide,NormalDesignCriteria(1),Temperature |
| ShellSideDesignTemperatureMaximum | Real | Temperature tmp | Assemblies,ShellSide,MaximumDesignCriteria,Temperature |
| ShellSideDrainNozzleNumber | Integer | | Assemblies,ShellSide,Nozzles["NozzleFunction="Drain"],Number |
| ShellSideDrainNozzleRating | eNozzleRating2_PIP VEI | | Assemblies,ShellSide,Nozzles["NozzleFunction="Drain"],Rating |
| ShellSideDrainNozzleSize | Real | Length | Assemblies,ShellSide,Nozzles["NozzleFunction="Drain"],NominalSize |
| ShellSideFluidName | String | | MaterialPorts[PhysicalAllocation=ShellIn],Flow,Name |
| ShellSideFoulingCoefficient | Real | Heat Transfer Coef | Assemblies,PerformanceCriteria,ShellsidePerformance,FoulingCoefficient |
| ShellSideFoulingResistance | Real | Thermal Resistance | Assemblies,PerformanceCriteria,ShellsidePerformance,FoulingResistance |
| ShellSideGasketMaintenanceFactor | Real | Pressure abs | Assemblies,ShellSide,Gasket,MaintenanceFactor |
| ShellSideGasketMaterial | String | | Assemblies,Gasket,MaterialOfConstruction,MaterialName |
| ShellSideGasketThickness | Real | Length small | Assemblies,ShellSide,Gasket,BodyMaterial,Thickness |
| ShellSideGasketYFactor | Real | Pressure abs | Assemblies,ShellSide,Gasket,MinimumDesignSeatingStress |
| ShellSideInletNozzleInsideDiameter | Real | Length small | Assemblies,ShellSide,Nozzles[NozzleFunction="Inlet"],Bore |
| ShellSideInletNozzleNumber | Integer | | Assemblies,ShellSide,Nozzles[NozzleFunction="Inlet"],Number |
| ShellSideInletNozzleRating | eNozzleRating1_PIP VEI | | Assemblies,ShellSide,Nozzles[NozzleFunction="Inlet"],Rating |
| ShellSideInletNozzleRhoV2 | Real | Density VelocitySq | Assemblies,ShellSide,Nozzles[NozzleFunction="Inlet"],RhoV2 |

| Name | Type | | Path |
|---|---|---|---|
| ShellSideInletNozzleSize | Real | Length | Assemblies,ShellSide,Nozzles[NozzleFunction="Inlet"],NominalSize |
| ShellSideInletNozzleType | String | | Assemblies,ShellSide,Nozzles[NozzleFunction="Inlet"],Type |
| ShellSideInletPressure | Real | Pressure abs | MaterialPorts[PhysicalAllocation="ShellIn"],Flow,BulkFlow,Pressure |
| ShellSideInletTemperature | Real | Temperature tmp. | MaterialPorts[PhysicalAllocation="ShellIn"],Flow,BulkFlow,Temperature |
| ShellSideInletIntermediateNozzleNumber | Integer | | Assemblies,ShellSide,Nozzles[NozzleFunction="Intermediate"],Number |
| ShellSideInletIntermediateNozzleRating | eNozzleRating1_PIP_VEC | | Assemblies,ShellSide,Nozzles[NozzleFunction="Intermediate"],Rating |
| ShellSideIntermediateNozzleRhoV2 | Real | Density Velocity Sq | Assemblies,ShellSide,Nozzles[NozzleFunction="Intermediate"],RhoV2 |
| ShellSideIntermediateNozzleSize | Real | Length | Assemblies,ShellSide,Nozzles[NozzleFunction="Intermediate"],NominalSize |
| ShellSideIntermediateNozzleType | String | | Assemblies,ShellSide,Nozzles[NozzleFunction="Intermediate"],Type |
| ShellSideLatentHeat | Real | Latent heat normal | MaterialPorts[PhysicalAllocation="ShellIn"],Flow,BulkFlow,ThermodynamicProperties,HeatOfVapo |
| ShellSideLatentHeat | Real | Latent heat normal | MaterialPorts[PhysicalAllocation="ShellIn"],Flow,BulkFlow,ThermodynamicProperties,HeatOfVapo |
| ShellSideLatentHeatReferenceTemperature | Real | Temperature | MaterialPorts[PhysicalAllocation="ShellIn"],Flow,BulkFlow,TransportProperties,ReferenceTemper |
| ShellSideLiquidInletDensity | Real | Density | MaterialPorts[PhysicalAllocation="ShellIn"],Flow,Liquid1Phase,PvtProperties,DensityMassBasis |
| ShellSideLiquidInletFlow | Real | Flow Rate(Mass) | MaterialPorts[PhysicalAllocation="ShellIn"],Flow,Liquid1Phase,MassFlowRate |
| ShellSideLiquidInletSpecificHeat | Real | Spec Heat Cap (Ma | MaterialPorts[PhysicalAllocation="ShellIn"],Flow,Liquid1Phase,ThermodynamicProperties,HeatCa |
| ShellSideLiquidInletSurfaceTension | Real | Surface Tension | MaterialPorts[PhysicalAllocation="ShellIn"],Flow,Liquid1Phase,TransportProperties,SurfaceTensio |
| ShellSideLiquidInletThermalConductivity | Real | Thermal Conductivi | MaterialPorts[PhysicalAllocation="ShellIn"],Flow,Liquid1Phase,TransportProperties,ThermalCond |
| ShellSideLiquidInletViscosity | Real | Dynamic Viscosity | MaterialPorts[PhysicalAllocation="ShellIn"],Flow,Liquid1Phase,TransportProperties,Viscosity |
| ShellSideLiquidOutletDensity | Real | Density | MaterialPorts[PhysicalAllocation="ShellOut"],Flow,Liquid1Phase,PvtProperties,DensityMassBasis |
| ShellSideLiquidOutletFlow | Real | Flow Rate (Mass) | MaterialPorts[PhysicalAllocation="ShellOut"],Flow,Liquid1Phase,MassFlowRate |
| ShellSideLiquidOutletNozzleInsideDiameter | Real | Length small | Assemblies,ShellSide,Nozzles[NozzleFunction="LiquidOutlet"],Bore |
| ShellSideLiquidOutletNozzleNumber | Integer | | Assemblies,ShellSide,Nozzles[NozzleFunction="LiquidOutlet"],Number |
| ShellSideLiquidOutletNozzleRating | eNozzleRating1_PIP_VEC | | Assemblies,ShellSide,Nozzles[NozzleFunction="LiquidOutlet"],Rating |
| ShellSideLiquidOutletNozzleRhoV2 | Real | Density Velocity Sq | Assemblies,ShellSide,Nozzles[NozzleFunction="LiquidOutlet"],RhoV2 |

FIG. 4N

| Name | Type | | Path |
|---|---|---|---|
| ShellSideLiquidOutletNozzleType | String | | Assemblies.ShellSide.Nozzles[NozzleFunction="LiquidOutlet"].Bore |
| ShellSideLiquidOutletSpecificHeat | Real | Spec Heat Cap (Ma | MaterialPorts[PhysicalAllocation="ShellOut"].Flow.Liquid1Phase.ThermodynamicProperties.HeatO |
| ShellSideLiquidOutletSurfaceTension | Real | Surface tension PQ | MaterialPorts[PhysicalAllocation="ShellOut"].Flow.Liquid1Phase.TransportProperties.SurfaceTens |
| ShellSideLiquidOutletThermalConductivity | Real | Thermal Conductivi | MaterialPorts[PhysicalAllocation="ShellOut"].Flow.Liquid1Phase.TransportProperties.ThermalCon |
| ShellSideLiquidOutletViscosity | Real | Dynamic Viscosity | MaterialPorts[PhysicalAllocation="ShellOut"].Flow.Liquid1Phase.TransportProperties.Viscosity |
| ShellSideMinimumDesignMetalTemperature | Real | Temperature | Assemblies.ShellSide.MinimumDesignCriteria(1).MetalTemperature |
| ShellSideNoncondensableInletFlow | Real | Flow Rate (Mass) | MaterialPorts[PhysicalAllocation="ShellIn"].Flow.NonCondesible.MassFlowRate |
| ShellSideNoncondensableInletMw | Real | Molar Mass | MaterialPorts[PhysicalAllocation="ShellIn"].Flow.NonCondesible.MolecularWeight |
| ShellSideNoncondensableOutletFlow | Real | Flow Rate (Mass) | 5MaterialPorts[PhysicalAllocation="ShellOut"].Flow.NonCondesible.MassFlowRate |
| ShellSideNoncondensableOutletMw | Real | Molar Mass | MaterialPorts[PhysicalAllocation="ShellOut"].Flow.NonCondesible.PvtProperties.MolecularWeig. |
| ShellSideNumberOfPassesPerShell | Integer | | Assemblies.ShellSide.NumberOfPasses |
| ShellSideOutletNozzleInsideDiameter | Real | Length small | Assemblies.ShellSide.Nozzles[NozzleFunction="Outlet"].Bore |
| ShellSideOutletNozzleNumber | Integer | | Assemblies.ShellSide.Nozzles[NozzleFunction="Outlet"].Number |
| ShellSideOutletNozzleRating | eNozzleRating1_PIP VEC | | Assemblies.ShellSide.Nozzles[NozzleFunction="Outlet"].Rating |
| ShellSideOutletNozzleRhoV2 | Real | Density Velocity Sq | Assemblies.ShellSide.Nozzles[NozzleFunction="Outlet"].RhoV2 |
| ShellSideOutletNozzleSize | Real | Length | Assemblies.ShellSide.Nozzles[NozzleFunction="Outlet"].NominalSize |
| ShellSideOutletNozzleType | String | | Assemblies.ShellSide.Nozzles[NozzleFunction="Outlet"].Type |
| ShellSideOutletTemperature | Real | Temperature tmp | MaterialPorts[PhysicalAllocation="ShellOut"].Flow.BulkFlow.Temperature |
| ShellSidePressureDropAllowable | Real | Pressure Diff | Assemblies.ShellSide.NormalOperatingCriteria(1).PressureDrop |
| ShellSidePressureDropCalculated | Real | Pressure Diff | Assemblies.ShellSide.NormalOperatingCriteria(2).PressureDrop |
| ShellSideSteamInletFlow | Real | Flow Rate (Mass) | MaterialPorts[PhysicalAllocation="ShellIn"].Flow.Steam.MassFlowRate |
| ShellSideSteamOutletFlow | Real | Mass flow normal | MaterialPorts[PhysicalAllocation="ShellOut"].Flow.Steam.MassFlowRate |
| ShellSideTestPressure | Real | Pressure abs | Assemblies.ShellSide.InspectionAndTests.HydrostaticTestPressure |
| ShellSideTotalFluidQuantity | Real | Flow Rate(Mass) | MaterialPorts[PhysicalAllocation="ShellIn"].Flow.BulkFlow.MassFlowRate |

FIG. 40

| | | | |
|---|---|---|---|
| ShellSideVaporInletDensity | Real | Density | MaterialPorts[PhysicalAllocation="ShellIn"],Flow,VapourPhase,PvtProperties,DensityMassBasis |
| ShellSideVaporInletFlow | Real | Flow Rate (Mass) | MaterialPorts[PhysicalAllocation="ShellIn"],Flow,VapourPhase,MassFlowRate |
| ShellSideVaporInletMw | Real | Molar Mass | MaterialPorts[PhysicalAllocation="ShellIn"],Flow,VapourPhase,MolecularWeight |
| ShellSideVaporInletSpecificHeat | Real | Spec Heat Cap (Ma | MaterialPorts[PhysicalAllocation="ShellIn"],Flow,VapourPhase,ThermodynamicProperties,HeatCa |
| ShellSideVaporInletThermalConductivity | Real | Thermal Conductivi | MaterialPorts[PhysicalAllocation="ShellIn"],Flow,VapourPhase,TransportProperties,ThermalCond |
| ShellSideVaporInletViscosity | Real | Dynamic Viscosity | MaterialPorts[PhysicalAllocation="ShellIn"],Flow,VapourPhase,TransportProperties,Viscosity |
| ShellSideVaporOutletDensity | Real | Density | MaterialPorts[PhysicalAllocation="ShellOut"],Flow,VapourPhase,PvtProperties,DensityMassBasis |
| ShellSideVaporOutletFlow | Real | Flow Rate (Mass) | MaterialPorts[PhysicalAllocation="ShellOut"],Flow,VapourPhase,MassFlowRate |
| ShellSideVaporOutletMw | Real | Molar Mass | MaterialPorts[PhysicalAllocation="ShellOut"],Flow,VapourPhase,PvtProperties,MolecularWeight |
| ShellSideVaporOutletNozzleNumber | Integer | | Assemblies,ShellSide,Nozzles[NozzleFunction="VapourOutlet"],Number |
| ShellSideVaporOutletNozzleRhoV2 | Real | Density Velocity Sq | Assemblies,ShellSide,Nozzles[NozzleFunction="VapourOutlet"],RhoV2 |
| ShellSideVaporOutletNozzleSize | Real | Length small | Assemblies,ShellSide,Nozzles[NozzleFunction="VapourOutlet"],NominalSize |
| ShellSideVaporOutletNozzleType | String | | Assemblies,ShellSide,Nozzles[NozzleFunction="VapourOutlet"],Type |
| ShellSideVaporOutletSpecificHeat | Real | Spec Heat Cap (Ma | MaterialPorts[PhysicalAllocation="ShellOut"],Flow,VapourPhase,ThermodynamicProperties,HeatC |
| ShellSideVaporOutletThermalConductivity | Real | Thermal Conductivi | MaterialPorts[PhysicalAllocation="ShellOut"],Flow,VapourPhase,TransportProperties,ThermalCon |
| ShellSideVaporOutletThermalConductivity | Real | Thermal Conductivi | MaterialPorts[PhysicalAllocation="ShellOut"],Flow,VapourPhase,TransportProperties,ThermalCon |
| ShellSideVaporOutletViscosity | Real | Dynamic Viscosity | MaterialPorts[PhysicalAllocation="ShellOut"],Flow,VapourPhase,TransportProperties,Viscosity |
| ShellSideVelocity | Real | Velocity | Assemblies,PerformanceCriteria,ShellsidePerformance,MidpointVelocity |
| ShellSideVelocityMaximum | Real | Velocity small | Assemblies,NormalDesignCriteria,ShellsideDesign,MaximumVelocity |
| ShellSideVentNozzleNumber | Integer | | Assemblies,ShellSide,Nozzles[NozzleFunction="Vent"],Number |
| ShellSideVentNozzleRating | eNozzleRating2_PIP_VEI | | Assemblies,ShellSide,Nozzles[NozzleFunction="Vent"],Rating |
| ShellSideVentNozzleSize | Real | Length | Assemblies,ShellSide,Nozzles[NozzleFunction="Vent"],NominalSize |
| ShellSideWaterInletFlow | Real | Flow Rate (Mass) | MaterialPorts[PhysicalAllocation="ShellIn"],Flow,CoolingWater,MassFlowRate |
| ShellSideWaterOutletFlow | Real | Flow Rate (Mass) | MaterialPorts[PhysicalAllocation="ShellOut"],Flow,CoolingWater,MassFlowRate |

| | | |
|---|---|---|
| ShellsInParallelMaximum | Integer | NormalDesignCriteria(1).MaximumShellsInParallel |
| ShellsInParallelMinimum | Integer | NormalDesignCriteria(1).MinimumShellsInParallel |
| ShellsInParallelNumber | Integer | NumberShellsInParallel |
| ShellsInSeriesMaximum | Integer | NormalDesignCriteria(1).MaximumShellsInSeries |
| ShellsInSeriesMinimum | Integer | NormalDesignCriteria(1).MinimumShellsInSeries |
| ShellsInSeriesNumber | Integer | NumberShellsInSeries |
| ShellsMultiple | Boolean | MultipleShells |
| Shellsperunit | Integer | NumberShellsPerUnit |
| ShellSupportsCorrosionAllowance | Real Length small | Assemblies.ShellSide.Shell.Shell_Support.MaterialOfConstruction.CorrosionAllowance |
| ShellSupportsMaterial | String | Assemblies.ShellSide.Shell.Shell_Support.MaterialOfConstruction.MaterialName |
| ShellTEMAType | eShellITEMAType | Assemblies.ShellSide.Shell.TemaShellType |
| ShellThickness | Real Length small | Assemblies.ShellSide.Shell.Thickness |
| ShellThicknessMinimum | Real Length | |
| ShopManpowerCost | Real Currency | CostData.ShopManpowerCost |
| ShopOverhead | Real Currency | CostData.ShopOverhead |
| ShutdownShellMeanMetalTemperature | Real Temperature | Assemblies.ShellSide.Shell.NormalDesignCriteria(1).MetalTemperature |
| ShutdownShellPressure | Real Pressure gauge | Assemblies.ShellSide.Shell.NormalDesignCriteria(1).Pressure |
| ShutdownTubeMeanMetalTemperature | Real Temperature | Assemblies.Bundle.TubeType(1).NormalDesignCriteria(1).MetalTemperature |
| ShutdownTubePressure | Real Pressure gauge | Assemblies.Bundle.TubeType(1).NormalDesignCriteria(1).Pressure |
| ShutdownTubeSheetMeanMetalTemperature | Real Temperature | Assemblies.Bundle.Tubesheets(1).NormalDesignCriteria(1).MetalTemperature |
| ShutupShellMeanMetalTemperature | Real Temperature | Assemblies.ShellSide.Shell.NormalDesignCriteria(1).MetalTemperature |
| StartupShellPressure | Real Pressure gauge | Assemblies.ShellSide.Shell.NormalDesignCriteria(1).Pressure |
| StartupTubeMeanMetalTemperature | Real Temperature | Assemblies.Bundle.TubeType(1).NormalDesignCriteria(1).MetalTemperature |
| StartupTubePressure | Real Pressure gauge | Assemblies.Bundle.TubeType(1).NormalDesignCriteria(1).Pressure |

| | | | |
|---|---|---|---|
| StartupTubeSheetMeanMetalTemperature | Real | Temperature | Assemblies,Bundle,TubeSheets(1),NormalDesignCriteria(1),MetalTemperature |
| Status | String | | Status |
| SteamOutShellMeanMetalTemperature | Real | Temperature | Assemblies,ShellSide,Shell,NormalDesignCriteria(1),SteamOutTemperature |
| SteamOutShellPressure | Real | Pressure gauge | Assemblies,ShellSide,Shell,NormalDesignCriteria(1),SteamOutPressure |
| SteamOutShellRequirement | Boolean | | Assemblies,ShellSide,Shell,NormalDesignCriteria,SteamOutRequirement |
| SteamOutTemperature | Real | Temperature | Assemblies,ShellSide,Shell,NormalDesignCriteria,SteamOutTemperature |
| SteamOutTubeMeanMetalTemperature | Real | Temperature | Assemblies,Bundle,TubeType(1),NormalDesignCriteria(1),SteamOutTemperature |
| SteamOutTubePressure | Real | Pressure gauge | Assemblies,Bundle,TubeType(1),NormalDesignCriteria(1),SteamOutPressure |
| SteamOutTubeSheetMeanMetalTemperature | Real | Temperature | Assemblies,Bundle,Tubesheets(1),NormalDesignCriteria(1),SteamOutPressure |
| SurfaceExcessMinimum | Real | Area normal | |
| SurfacePerShellEffective | Real | Area normal | Assemblies,Bundle,ShellSide,EffectiveArea |
| SurfacePerUnitEffective | Real | Area | EffectiveSurfacePerUnit |
| SurfacePerUnitRequired | Real | Area normal | RequiredSurfacePerUnit |
| TEMAClass | eTemaClass(ShellAndTu| | | TEMAClass |
| TEMAOrientation | eTemaOrientation PIP \ | | TEMAOrientation |
| TEMARemarks | String | | TEMARemarks |
| TEMASize | String | | Status |
| TEMAType | String | | Type |
| TemperatureShellDesign | Real | Temperature tmf | NormalDesignCriteria(1),ShellsideDesign,Temperature |
| TemperatureTubeDesign | Real | Temperature tmf | NormalDesignCriteria(1),ShellsideDesign,Temperature |
| TemperatureTubeDesign | Real | Temperature tmf | NormalDesignCriteria(1),TubesideDesign,Temperature |
| TerminalStreams | MaterialFlowSpecification | | MaterialPorts(*),PipingSystem |
| TestRingRequired | Boolean | | InpsectionAndTests,TestRingRequired |
| ThicknessShell | Real | Length small | Assemblies,ShellSide,Thickness |

| | | | |
|---|---|---|---|
| TotalCost | Real | Currency | CostData.TotalCost |
| TubeBaffleDiametralClearance | Real | Length normal | Assemblies.Bundle.TubeToBaffleClearance |
| TubeBWGAverage | Integer | | Assemblies.Bundle.TubeType(1).BirminghamWireGauge |
| TubeBWGMinimum | Integer | | Assemblies.Bundle.TubeType(1).BirminghamWireGaugeMinimum |
| TubeCorrosionAllowance | Real | Length Inches | NormalDesignCriteria(1).TubesideDesign.AllowableCorrosionAllowance |
| TubeFinDiameterOuter | Real | Length Inches | Assemblies.Bundle.TubeType(1).Externals.OuterDiameter |
| TubeFinDiameterRoot | Real | Length normal | Assemblies.Bundle.TubeType(1).Externals.RootDiameter |
| TubeFinHeight | Real | Length normal | Assemblies.Bundle.TubeType(1).Externals.Height |
| TubeFinMaterial | String | | Assemblies.Bundle.TubeType(1).Externals.MaterialOfConstruction.MaterialName |
| TubeFinPerUnitLength | Real | Inverse length | Assemblies.Bundle.TubeType(1).Externals.NumberOfFinsPerUnitLength |
| TubeFinPitch | Real | Length normal | Assemblies.Bundle.TubeType(1).Externals.FinPitch |
| TubeFinThickness | Real | Length normal | Assemblies.Bundle.TubeType(1).Externals.AverageThickness |
| TubeInletEndlength | Real | Length normal | Assemblies.Bundle.TubeType(1).InletEndlength |
| TubeInnerDiameter | Real | Length small | Assemblies.Bundle.TubeType(1).InnerDiameter |
| TubeLayout | eTubeLayout(Exchange | | Assemblies.Bundle.TubeLayout |
| TubeLayoutAlternate | eTubeLayout(Exchange | | Assemblies.Bundle.TubeLayoutAlternate |
| TubeLayoutSpec | eTubeLayout(Exchange | | Assemblies.Bundle.TubeLayoutSpec |
| TubeLength | Real | Length | Assemblies.Bundle.TubeType(1).TotalLength |
| TubeLengthIncrement | Real | Length small | NormalDesignCriteria(1).TubesideDesign.TubeLengthIncrement |
| TubeLengthMaximum | Real | Length small | NormalDesignCriteria(1).TubesideDesign.MaximumTubeLength |
| TubeLengthMinimum | Real | Length small | NormalDesignCriteria(1).TubesideDesign.MinimumTubeLength |
| TubeLengthStraight | Real | Length normal | Assemblies.Bundle.TubeType(1).StraightLength |
| TubeLengthUnfinnedAtBaffles | Real | Length | |
| TubeMaterial | String | | Assemblies.Bundle.TubeType(1).MaterialOfConstruction.MaterialName |

FIG. 4S

| | | | |
|---|---|---|---|
| TubeMaterialClass | String | | Assemblies,Bundle,TubeType(1),MaterialOfConstruction,MaterialName |
| TubeMaterialDensity | Real | Density | Assemblies,Bundle,TubeType(1),MaterialOfConstruction,Density |
| TubeNumber | Integer | | Assemblies,Bundle,TotalNumberOfTubes |
| TubeOuterDiameter | Real | Length | Assemblies,Bundle,TotalType(1),OuterDiameter |
| TubeOuterDiameterAlternate | Real | Length small | Assemblies,Bundle,TubeType(1),OuterDiameterAlternate |
| TubeOuterEndlength | Real | Length normal | Assemblies,Bundle,TubeType(1),OuterEndlength |
| TubePassesIncrement | String | | |
| TubePassesNumberPerShell | Integer | | Assemblies,Bundle,NumberTubePassesPerShell |
| TubePassesNumberPerShellMaximum | Real | | |
| TubePassesNumberPerShellMinimum | Real | | |
| TubePitch | Real | Length | Assemblies,Bundle,TubePitch |
| TubePitchAlternate | Real | Length normal | Assemblies,Bundle,TubePitchAlternate |
| TubeCorrosionAllowance | Real | Length small | Assemblies,Bundle,TubeType(1),MaterialOfConstruction,CorrosionAllowance |
| TubeSheetFloatingMaterial | String | | Assemblies,Bundle,TubeType(1),MaterialOfConstruction,MaterialName |
| TubeSheetCorrosionAllowance | Real | Length | Assemblies,Bundle,Tubesheets(2),MaterialOfConstruction,CorrosionAllowance |
| TubeSheetsMaterial | String | | Assemblies,Bundle,Tubesheets(1),MaterialOfConstruction,MaterialName |
| TubeSheetThickness | Real | Length | Assemblies,Bundle,Tubesheets(1),MaterialOfConstruction,Thickness |
| TubeSideAverageFilmCoefficient | Real | Heat Transfer Coef | Assemblies,Bundle,PerformanceCriteria,TubesidePerformance,BulkFilmCoefficient |
| TubeSideCleaning | String | | Assemblies,Bundle,MechanicalCleaning |
| TubeSideCorrosionAllowance | Real | Length | Assemblies,Bundle,TubeType(1),MaterialOfConstruction,CorrosionAllowance |
| TubeSideDesignPressure | Real | Pressure abs | Assemblies,Bundle,NormalDesignCriteria(1),Pressure |
| TubeSideDesignPressureMaximum | Real | Pressure abs | Assemblies,Bundle,MaximumDesignCriteria(1),Pressure |
| TubeSideDesignTemperature | Real | Temperature tmp | Assemblies,Bundle,NormalDesignCriteria(1),Temperature |
| TubeSideDesignTemperatureMaximum | Real | Temperature tmp | Assemblies,Bundle,MaximumDesignCriteria(1),Temperature |

FIG. 4T

| | | | |
|---|---|---|---|
| TubeSideDrainNozzleNumber | Integer | | Assemblies.Bundle.Nozzles[NozzleFunction="Drain"].Number |
| TubeSideDrainNozzleNumber | Integer | | Assemblies.Bundle.Nozzles[NozzleFunction="Drain"].Number |
| TubeSideDrainNozzleRating | eNozzleRating2_PIP_VEC | | Assemblies.Bundle.Nozzles[NozzleFunction="Drain"].Rating |
| TubeSideDrainNozzleSize | Real | Length | Assemblies.Bundle.Nozzles[NozzleFunction="Drain"].NominalSize |
| TubeSideFluidName | String | | MaterialPorts[PhysicalAllocation="TubeIn"].Flow.Name |
| TubeSideFoulingCoefficient | Real | Heat Transfer Coef | Assemblies.PerformanceCriteria.TubesidePerformance.FoulingCoefficient |
| TubeSideFoulingResistance | Real | Thermal Resistance | Assemblies.PerformanceCriteria.TubesidePerformance.FoulingResistance |
| TubeSideGasketMainenanceFactor | Real | Pressure abs | Assemblies.Bundle.Gasket.MaintenaceFactor |
| TubeSideGasketMaterial | String | | Assemblies.Bundle.Gasket.BodyMaterial.MaterialName |
| TubeSideGasketThickness | Real | Length small | Assemblies.Bundle.Gasket.BodyMaterial.Thickness |
| TubeSideGasketFactor | Real | Pressure abs | Assemblies.Bundle.Gasket.MinimumDesignSeatingStress |
| TubeSideInletNozzleAngularPosition | Real | Plane Angle | |
| TubeSideInletNozzleDistanceFromTubesheet | Real | Length | |
| TubeSideInletNozzleInsideDiameter | Real | Length small | Assemblies.Bundle.Nozzles[NozzleFunction="Inlet"].Bore |
| TubeSideInletNozzleNumber | Integer | | Assemblies.Bundle.Nozzles[NozzleFunction="Inlet"].Number |
| TubeSideInletNozzlePressureDrop | Real | Pressure | |
| TubeSideInletNozzleRating | eNozzleRating2_PIP_VEC | | Assemblies.Bundle.Nozzles[NozzleFunction="Inlet"].Rating |
| TubeSideInletNozzleRhoV2 | Real | Density Velocity Sq | Assemblies.Bundle.Nozzles[NozzleFunction="Intermediate"].RhoV2 |
| TubeSideInletNozzleSize | Real | Length | Assemblies.Bundle.Nozzles[NozzleFunction="Inlet"].NominalSize |
| TubeSideInletNozzleType | String | | Assemblies.Bundle.Nozzles[NozzleFunction="Intermediate"].Type |
| TubeSideInletNozzleWallThickness | Real | Length | |
| TubeSideInletPressure | Real | Pressure abs | MaterialPorts[PhysicalAllocation="TubeIn"].Flow.BulkFlow.Pressure |
| TubeSideInletTemperature | Real | Temperature tmp | MaterialPorts[PhysicalAllocation="TubeIn"].Flow.BulkFlow.Temperature |
| TubeSideIntermediateNozzleNumber | Integer | | Assemblies.Bundle.Nozzles[NozzleFunction="Intermediate"].Number |

| | | | |
|---|---|---|---|
| TubeSideIntermediateNozzleRating | eNozzleRating2_PIP VEC | | Assemblies.Bundle.Nozzles[NozzleFunction="Intermediate"].Rating |
| TubeSideIntermediateNozzleRhoV2 | Real | Density Velocity Sq | Assemblies.Bundle.Nozzles[NozzleFunction="Intermediate"].RhoV2 |
| TubeSideIntermediateNozzleSize | Real | Length | Assemblies.Bundle.Nozzles[NozzleFunction="Intermediate"].NominalSize |
| TubeSideIntermediateNozzleType | String | | Assemblies.Bundle.Nozzles[NozzleFunction="Intermediate"].Type |
| TubeSideLatentHeat | Real | Latent heat normal | MaterialPorts[PhysicalAllocation="TubeIn"].Flow.BulkFlow.ThermodynamicProperties.HeatOfVapo |
| TubeSideLatentHeatReferenceTemperature | Real | Temperature | MaterialPorts[PhysicalAllocation="TubeIn"].Flow.BulkFlow.ThermodynamicProperties.ReferenceTemper |
| TubeSideLiquidInletDensity | Real | Density | MaterialPorts[PhysicalAllocation="TubeIn"].Flow.Liquid1Phase.PvtProperties.DensityMassBasis |
| TubeSideLiquidInletFlow | Real | Flow Rate (Mass) | MaterialPorts[PhysicalAllocation="TubeIn"].Flow.Liquid1Phase.MassFlowRate |
| TubeSideLiquidInletSpecificHeat | Real | Spec Heat Cap (MB | MaterialPorts[PhysicalAllocation="TubeIn"].Flow.Liquid1Phase.ThermodynamicProperties.HeatCa |
| TubeSideLiquidInletSurfaceTension | Real | Surface Tension | |
| TubeSideLiquidInletThermalConductivity | Real | Thermal Conductivity | MaterialPorts[PhysicalAllocation="TubeIn"].Flow.Liquid1Phase.TransportProperties.ThermalCond |
| TubeSideLiquidInletViscosity | Real | Dynamic Viscosity | MaterialPorts[PhysicalAllocation="TubeIn"].Flow.Liquid1Phase.TransportProperties.Viscosity |
| TubeSideLiquidOutletDensity | Real | Density | MaterialPorts[PhysicalAllocation="TubeOut"].Flow.Liquid1Phase.PvtProperties.DensityMassBasis |
| TubeSideLiquidOutletFlow | Real | Flow Rate (Mass) | MaterialPorts[PhysicalAllocation="TubeOut"].Flow.Liquid1Phase.MassFlowRate |
| TubeSideLiquidOutletNozzleInsideDiameter | Real | Length small | Assemblies.Bundle.Nozzles[NozzleFunction="LiquidOutlet"].Bore |
| TubeSideLiquidOutletNozzleNumber | Integer | | Assemblies.Bundle.Nozzles[NozzleFunction="LiquidOutlet"].Number |
| TubeSideLiquidOutletNozzleRating | eNozzleRating2_PIP VEC | | Assemblies.Bundle.Nozzles[NozzleFunction="LiquidOutlet"].Rating |
| TubeSideLiquidOutletNozzleRhoV2 | Real | Density Velocity Sq | Assemblies.Bundle.Nozzles[NozzleFunction="LiquidOutlet"].RhoV2 |
| TubeSideLiquidOutletNozzleSize | Real | Length small | Assemblies.Bundle.Nozzles[NozzleFunction="LiquidOutlet"].NominalSize |
| TubeSideLiquidOutletNozzleType | String | | Assemblies.Bundle.Nozzles[NozzleFunction="LiquidOutlet"].Type |
| TubeSideLiquidOutletSpecificHeat | Real | Spec Heat Cap. (Ma | MaterialPorts[PhysicalAllocation="TubeOut"].Flow.Liquid1Phase.ThermodynamicProperties.HeatO |
| TubeSideLiquidOutletThermalConductivity | Real | Thermal Conductivity | MaterialPorts[PhysicalAllocation="TubeOut"].Flow.Liquid1Phase.TransportProperties.ThermalCon |
| TubeSideLiquidOutletViscosity | Real | Dynamic Viscosity | MaterialPorts[PhysicalAllocation="TubeOut"].Flow.Liquid1Phase.TransportProperties.Viscosity |
| TubeSideMinimumDesignMetalTemperature | Real | Temperature | MinimumDesignCriteria(1).MetalTemperature |

34

| | | | |
|---|---|---|---|
| TubeSideNoncondensableInletFlow | Real | Flow Rate (Mass) | MaterialPorts[PhysicalAllocation="TubeIn"],Flow,NonCondensibles,MassFlowRate |
| TubeSideNoncondensableInletMw | Real | Molar Mass | MaterialPorts[PhysicalAllocation="TubeIn"],Flow,NonCondensibles,MolecularWeight |
| TubeSideNoncondensableOutletFlow | Real | Flow Rate (Mass) | MaterialPorts[PhysicalAllocation="TubeOut"],Flow,NonCondensibles,MassFlowRate |
| TubeSideNoncondensableOutletMw | Real | Molar Mass | MaterialPorts[PhysicalAllocation="TubeOut"],Flow,NonCondensibles,MolecularWeight |
| TubeSideOutletNozzleInsideDiameter | Real | Length | Assemblies,Bundle,Nozzles[NozzleFunction="Outlet"],Bore |
| TubeSideOutletNozzleNumber | Integer | Quantity Type | Assemblies,Bundle,Nozzles[NozzleFunction="Outlet"],Number |
| TubeSideOutletNozzleNumber | Integer | | Assemblies,Bundle,Nozzles[NozzleFunction="Outlet"],Number |
| TubeSideOutletNozzleRating | eNozzleRating2_PIP VEC | | Assemblies,Bundle,Nozzles[NozzleFunction="Outlet"],Rating |
| TubeSideOutletNozzleRhoV2 | Real | Density Velocity Sq | Assemblies,Bundle,Nozzles[NozzleFunction="Outlet"],Rho2 |
| TubeSideOutletNozzleSize | Real | Length | Assemblies,Bundle,Nozzles[NozzleFunction="Outlet"],NominalSize |
| TubeSideOutletNozzleType | String | | Assemblies,Bundle,Nozzles[NozzleFunction="Outlet"],Type |
| TubeSideOutletSurfaceTension | Real | Surface Tension | |
| TubeSideOutletTemperature | Real | Temperature tmp | MaterialPorts[PhysicalAllocation="TubeOut"],Flow,BulkFlow,Temperature |
| TubeSidePassesMaximum | Real | | |
| TubeSidePassesMinimum | Real | | |
| TubeSidePassesNumberPerShell | Integer | | NumberTubePasses |
| TubeSidePressureDropAllowable | Real | Pressure Diff | Assemblies,Bundle,NormalDesignCriteria,PressureDrop |
| TubeSidePressureDropCalculated | Real | Pressure Diff | Assemblies,Bundle,NormalOperatingCriteria,PressureDrop |
| TubeSideSteamInletFlow | Real | Flow Rate(Mass) | MaterialPorts[PhysicalAllocation="TubeIn"],Flow,Steam,MassFlowRate |
| TubeSideSteamOutletFlow | Real | Flow Rate(Mass) | MaterialPorts[PhysicalAllocation="TubeOut"],Flow,Steam,MassFlowRate |
| TubeSideTestPressure | Real | Pressure abs | Assemblies,Bundle,InspectionAndTests,HydrostaticTestPressure |
| TubeSideTotalFluidQuantity | Real | Flow Rate (Mass) | MaterialPorts[PhysicalAllocation="TubeIn"],Flow,BulkFlow,MassFlowRate |
| TubeSideVaporInletDensity | Real | Density | MaterialPorts[PhysicalAllocation="TubeIn"],Flow,VapourPhase,PvtProperties,DensityMassBasis |
| TubeSideVaporInletFlow | Real | Flow Rate (Mass) | MaterialPorts[PhysicalAllocation="TubeIn"],Flow,VapourPhase,MassFlowRate |

| | | | |
|---|---|---|---|
| TubeSideVaporInletFlow | Real | Molar Mass | MaterialPorts[PhysicalAllocation="TubeIn"].Flow.VapourPhase.MolecularWeight |
| TubeSideVaporInletSpecificHeat | Real | Spec Heat Cap(Ma | MaterialPorts[PhysicalAllocation="TubeIn"].Flow.VapourPhase.ThermodynamicProperties.HeatCa |
| TubeSideVaporInletThermalConductivity | Real | Thermal Conductivi | MaterialPorts[PhysicalAllocation="TubeIn"].Flow.VapourPhase.TransportProperties.ThermalConc |
| TubeSideVaporInletViscosity | Real | Dynamic Viscosity | MaterialPorts[PhysicalAllocation="TubeIn"].Flow.VapourPhase.TransportProperties.Viscosity |
| TubeSideVaporOutletDensity | Real | Density | MaterialPorts[PhysicalAllocation="TubeOut"].Flow.VapourPhase.PvtProperties.DensityMassBasis |
| TubeSideVaporOutletFlow | Real | Flow Rate (Mass) | MaterialPorts[PhysicalAllocation="TubeOut"].Flow.VapourPhase.MassFlowRate |
| TubeSideVaporOutletMw | Real | Molar Mass | MaterialPorts[PhysicalAllocation="TubeOut"].Flow.VapourPhase.MolecularWeight |
| TubeSideVaporOutletNozzleRhoV2 | Real | Density Velocity Sq | Assemblies.Bundle.Nozzles[NozzleFunction="VaporOutlet"].RhoV2 |
| TubeSideVaporOutletNozzleSize | String | Length small | Assemblies.Bundle.Nozzles[NozzleFunction="VaporOutlet"].NominalSize |
| TubeSideVaporOutletNozzleType | String | | Assemblies.Bundle.Nozzles[NozzleFunction="VaporOutlet"].Type |
| TubeSideVaporOutletSpecificHeat | Real | Spec Heat Cap(Ma | MaterialPorts[PhysicalAllocation="TubeOut"].Flow.VapourPhase.ThermodynamicProperties.HeatC |
| TubeSideVaporOutletThermalConductivity | Real | Thermal Conductivi | MaterialPorts[PhysicalAllocation="TubeOut"].Flow.VapourPhase.TransportProperties.ThermalCon |
| TubeSideVaporOutletViscosity | Real | Dynamic Viscosity | MaterialPorts[PhysicalAllocation="TubeOut"].Flow.VapourPhase.TransportProperties.Viscosity |
| TubeSideVelocity | Real | Velocity | Assemblies.PerformanceCriteria.TubesidePerformance.MidpointVelocity |
| TubeSideVentNozzleNumber | Integer | | Assemblies.Bundle.Nozzles[NozzleFunction="Vent"].Number |
| TubeSideVentNozzleRating | eNozzleRating2_PIP_VEC | | Assemblies.Bundle.Nozzles[NozzleFunction="Vent"].Rating |
| TubeSideVentNozzleSize | Real | Length | Assemblies.Bundle.Nozzles[NozzleFunction="Vent"].NominalSize |
| TubeSideWaterInletFlow | Real | Flow Rate(Mass) | MaterialPorts[PhysicalAllocation="TubeIn"].Flow.CoolingWater.MassFlowRate |
| TubeSideWaterOutletFlow | Real | Flow Rate(Mass) | MaterialPorts[PhysicalAllocation="TubeOut"].Flow.CoolingWater.MassFlowRate |
| TubesInWindowNumberOf | Real | | |
| TubeSlope | Real | Plane Angle | Assemblies.Bundle.Slope |
| TubeSupport | String | | Assemblies.Bundle.BundleSupport.Type |
| TubeThermalConductivity | Real | Thermal Conductivi | Assemblies.Bundle.TubeType(1).MaterialOfConstruction.ThermalConductivity |
| TubeThickness | Real | Length | Assemblies.Bundle.TubeType(1).WallThickness |

| | | |
|---|---|---|
| TubeThicknessAlternate | Real | Length small | Assemblies.Bundle.TubeType(1).WallThicknessAlternate |
| TubeThicknessUnderFins | Real | Length small | |
| TubeToTubesheetJoint | eTubeToTubesheetJoint | | Assemblies.Bundle.Tubesheets(1).TubeToTubesheetJoint |
| TubeType | eType(ExchangerTube) | | Assemblies.Bundle.TubeType(1).TubeType |
| TubeYoungModulus | Real | Stress | Assemblies.Bundle.TubeType(1).MaterialOfConstruction.ElasticModulus |
| UBendRadius | Real | Length small | |
| UBendSupportDescription | String | | Assemblies.Bundle.UBendSupport.Description |
| UBendSupportType | eType(UBendSupport) | | Assemblies.Bundle.UBendSupport.SupportType |
| Upset1ShellMeanMetalTemperature | Real | Temperature | Assemblies.Bundle.ShellSide.Shell.NormalDesignCriteria(1).MetalTemperature |
| Upset1ShellPressure | Real | Pressure guage | Assemblies.Bundle.ShellSide.Shell.NormalDesignCriteria(1).Pressure |
| Upset1TubeMeanMetalTemperature | Real | Temperature | Assemblies.Bundle.TubeType(1).NormalDesignCriteria(1).MetalTemperature |

| Class View 'PIP VED5T00s' | | | |
|---|---|---|---|
| Name | Type | Quantity Type | Link |
| DatasheetObjectHeader | DatasheetObject | | |
| Page1 | | | |
| HeaderData | | | |
| PerformanceOfOneUnit | | | |
| ShellSide | | | |
| FluidName | String | | ShellAndTubeHeatExchanger,ShellSideFluidName |
| TotalfluidQuantity | Real | | ShellAndTubeHeatExchanger,ShellSideTotalFluidQuantity |
| FlowRate | Real | FlowRate(kg/h) | |
| MolecularWeight | Real | | |
| InletTemperature | Real | Temperature(C) | ShellAndTubeHeatExchanger,ShellSideInletTemperature |
| OutletTemperature | Real | Temperature(C) | ShellAndTubeHeatExchanger,ShellSideOutletTemperature |
| Density | | | |
| Viscosity | | | |
| SpecificHeat | | | |
| ThermalConductivity | | | |
| LatentHeat | Real | Calorific Val(kJ/kg) | ShellAndTubeHeatExchanger,ShellSideLatentHeat |
| LatentHeatReferenceTemperature | Real | Temperature(C) | ShellAndTubeHeatExchanger,ShellSideLatentHeatReferenceTemperature |
| InletPressure | Real | Pressure Absolute | ShellAndTubeHeatExchanger,ShellSideInletPressure |
| Velocity | Real | Velocity (m/s) | ShellAndTubeHeatExchanger,ShellSideVelocity |
| AllowablePressureDrop | Real | Pressure Diff (Mpa | ShellAndTubeHeatExchanger,ShellSidePressureDropAllowable |
| CalculatedPressureDrop | Real | Pressure Diff (Mpa | ShellAndTubeHeatExchanger,ShellSidePressureDropCalculated |

| | | | |
|---|---|---|---|
| FoulingResistance | Real | Fouling Resistance | ShellAndTubeHeatExchanger,ShellSideFoulingResistance |
| AverageFilmCoefficient | Real | Heat Transfer Coef | ShellAndTubeHeatExchanger,ShellSideAverageFilmCoefficient |
| TubeSide | | | |
| FluidName | String | | ShellAndTubeHeatExchanger,TubeSideFluidName |
| TotalfluidQuantity | Real | FlowRate(kg/h) | ShellAndTubeHeatExchanger,TubeSideTotalFluidQuantity |
| FlowRate | | | |
| MolecularWeight | | | |
| VaporInletMw | Real | Molar Mass | ShellAndTubeHeatExchanger,TubeSideVaporInletMw |
| VaporOutletMw | Real | Molar Mass | ShellAndTubeHeatExchanger,TubeSideVaporOutletMw |
| NoncondensableInletMw | Real | Molar Mass | ShellAndTubeHeatExchanger,TubeSideNoncondensableInletMw |
| NoncondensableOutletMw | Real | Molar Mass | ShellAndTubeHeatExchanger,TubeSideNoncondensableOutletMw |
| Inlet Temperature | Real | Temperature(C) | ShellAndTubeHeatExchanger,TubeSideInletTemperature |
| Outlet Temperature | Real | Temperature(C) | ShellAndTubeHeatExchanger,TubeSideOutletTemperature |
| Density | | | |
| VaporInletDensity | Real | Density | ShellAndTubeHeatExchanger,TubeSideVaporInletDensity |
| LiquidInletDensity | Real | Density | ShellAndTubeHeatExchanger,TubeSideLiquidInletDensity |
| VaporOutletDensity | Real | Density | ShellAndTubeHeatExchanger,TubeSideVaporOutletDensity |
| LiquidOutletDensity | Real | Density | ShellAndTubeHeatExchanger,TubeSideLiquidOutletDensity |
| Viscosity | | | |
| SpecificHeat | | | |
| ThermalConductivity | | | |
| LatentHeat | Real | Calorific Val(kJ/kg) | ShellAndTubeHeatExchanger,TubeSideLatentHeat |
| LatentHeatReferenceTemperature | Real | Temperature(C) | ShellAndTubeHeatExchanger,TubeSideLatentHeatReferenceTemperature |
| InletPressure | Real | Pressure Absolute | ShellAndTubeHeatExchanger,TubeSideInletPressure |
| Velocity | Real | Velocity (m/s) | ShellAndTubeHeatExchanger,TubeSideVelocity |

| Class View 'HetranExchangerInput' | | | |
|---|---|---|---|
| Name | Type | Quantity Type | Link |
| A DBNAME | String | | ShellAndTubeHeatExchanger,ItemNumber |
| A INDEX | String | | ShellAndTubeHeatExchanger,ItemNumber |
| N ProblemDefinition | | | |
|   A DBNAME | String | | ShellAndTubeHeatExchanger,ItemNumber |
|   N Description | | | |
|   N ApplicationOptions | | | |
|   N ProcessData | | | |
|     A DBNAME | String | | ShellAndTubeHeatExchanger,ItemNumber |
|     N ProcessDataTab | | | |
|     N HeatLoadBalanceOptions | | | |
| N PhysicalPropertyData | | | |
| N ExchangerGeometry | String | | ShellAndTubeHeatExchanger,ItemNumber |
|   A DBNAME | | | |
|   N Exchanger | | | |
|   N Tubes | | | |
|   N Bundle | String | | ShellAndTubeHeatExchanger,ItemNumber |
|     A DBNAME | | | |
|     N ShellInletOutlet | | | |
|     N Impingement | | | |
|       A IMPROTTYPE | eHetranImpProtType | | ShellAndTubeHeatExchanger,ImpingementProtectionType |
|     N LayoutOptions | | | |
|     N LayoutLimits | | | |
|     N Clearances | | | |
|   N Baffles | | | |

| | | | |
|---|---|---|---|
| A DBNAME | String | | ShellAndTubeHeatExchanger.ItemNumber |
| N BafflesTab | | | |
| A BAFTYPE | eHetranBafType | | |
| A BAFCUTPERC | Real | Percentage PQT | ShellAndTubeHeatExchanger.BaffleCut |
| A BAFORIE | String | | ShellAndTubeHeatExchanger.BaffleCutOrientation |
| N TubeSupports | | | |
| N RatingSimulationData | | | |
| A DBNAME | String | | ShellAndTubeHeatExchanger.ItemNumber |
| N RatingSimulationGeometry | | | |
| A SHLID | Real | Length small | ShellAndTubeHeatExchanger.ShellDiameterInner |
| A SHLOD | Real | Length small | ShellAndTubeHeatExchanger.ShellDiameterOuter |
| A BAFSPCCC | Real | Length small | ShellAndTubeHeatExchanger.BaffleSpacing |
| A BAFSPCIN | Real | Length small | ShellAndTubeHeatExchanger.BaffleSpacingFromInlet |
| A BAFSPCOUT | Real | Length small | ShellAndTubeHeatExchanger.BaffleSpacingFromOutlet |
| A BAFNUM | Integer | | ShellAndTubeHeatExchanger.BafflesNumber |
| A TUBELNG | Real | Length small | ShellAndTubeHeatExchanger.TubeLengthStraight |
| A TUBENUM | Integer | | ShellAndTubeHeatExchanger.TubeNumber |
| A TUBEPASSNUM | Integer | | ShellAndTubeHeatExchanger.TubePassesNumberPerShell |
| A SHLSERNUM | Integer | | ShellAndTubeHeatExchanger.ShellsInSeriesNumber |
| A SHLPARNUM | Integer | | ShellAndTubeHeatExchanger.ShellsInParallelNumber |
| N KettleVapourBelt | | | |
| A KETLOD | Real | Length small | ShellAndTubeHeatExchanger.KettleDiameterOuter |
| A KETLID | Real | Length small | ShellAndTubeHeatExchanger.KettleDiameterInner |
| A VAPBLTOD | Real | Length small | ShellAndTubeHeatExchanger.VaporBeltDiameterOuter |
| A VAPBLTID | Real | Length small | ShellAndTubeHeatExchanger.VaporBeltDiameterInner |

FIG. 5D

SYSTEM AND METHOD FOR ORGANIZING AND SHARING OF PROCESS PLANT DESIGN AND OPERATIONS DATA

RELATED APPLICATION

This application claims the benefit of U.S. Provisional Application No. 60/421,630, filed on Oct. 25, 2002, the entire teachings of which are incorporated herein by reference.

BACKGROUND OF THE INVENTION

Process engineering involves the design and operation of a wide variety of processing plants and processes carried out therein. Such processes include, but are not limited to, chemical, petrochemical, refining, pharmaceutical, polymer, plastics and other process industries. In process engineering, a plethora of computer-based tools are employed by engineers to develop and evaluate new processes, design and retrofit plants, and optimize the operation of existing plants. For example, it is typical for several dozen separate engineering design tools to be used solely during the front-end engineering design phase of a new plant design.

Engineering tools tend to be developed to address a specific aspect of the entire process plant; as a result each different tool typically manages its internal engineering data using different definitions, formats, and schemas. As a result, efficient exchange of data between disparate engineering tools, although highly desirable, is very difficult in practice. This leads to handover inefficiencies, errors and rework, and lost opportunity to re-use engineering project knowledge, i.e. between the plant design and operations phases.

Within the past decade there has been growing recognition of the potential use of engineering database systems for the management of process data and the integration of disparate engineering tools. Typical implementations are developed by linking engineering tools to homegrown proprietary databases and data models using proprietary interfaces.

Similarly, once a plant is built, there is a need to implement computer programs that monitor and optimize plant operation or enable access to equipment, materials, instruments, operating procedures, maintenance orders, or other information about the plant. Until now, the process of implementing such computer programs for use in plant operations has been a manual entry of data and manual search for information stored in many systems.

This means that in the plant operation there is no use of the data that was generated during engineering design (or vice versa, no use of data generated during plant operation in engineering design). In addition, manual search for plant information through disparate computer systems creates a lot of inefficiencies and errors (e.g. wrong version of documents on specific topic is retrieved).

The growing experience of practitioners in this area has raised a number of practical problems:

Scope limitations: Data models developed to support specific engineering tools or engineering phases are limited to the narrow scope of those tools. For example, a data model developed to support process simulation tools does not have the scope to support plant pipe line-sizing tools; a data model developed to support plant equipment maintenance does not have the scope to support detailed mechanical equipment design. The use of such data models beyond their original intended scope of application is problematic.

Complexity: Attempts to support a wider scope of application will lead to more complex data models; for example, concepts of inheritance, parts, and hierarchy are needed to adequately model process equipment. The required complexity of the data models makes it practically infeasible for non-expert engineers to access useful data.

Data portability limitations: Proprietary data models developed from different sources will differ widely in formats, terminology and schemas. These wide differences make it practically infeasible to exchange data between systems that were developed independently, without prohibitively expensive efforts to map the two data models.

Maintainability: Engineering systems need to evolve over time, to accommodate new tools and uses. This will often require significant data model changes, which will in turn require re-mapping and re-linking of all of the engineering tools in the system. Maintenance of constantly evolving engineering systems is extremely costly.

Inconsistent data used in engineering design and in plant operations: Since an existing plant is constantly being modified, it is practically impossible through a manual data entry to keep an updated set of data to be used for engineering design.

As the plant matures, there is an accumulation of an ever increasing amount of operating procedures, knowledge about best operating conditions, performance, maintenance procedures, and other information. Efficient access to all information related to a particular equipment, instrument, material, process unit, entire plant, enterprise, etc. is essential for rapid information review to enable agile decision making.

Given the above, there is a need for improvement in the methodology and systems used for managing plant process and operations data.

SUMMARY OF THE INVENTION

The applicants have developed a system and method for organizing and sharing process plant design and operations data which:

Is capable of supporting the full scope of process engineering activities in design and operations of the oil/gas/chemicals sectors and other manufacturing industries;

Enables companies in these sectors to converge on a common data modeling system, thus enabling them to share data directly;

Clearly separates data modeling and engineering tasks;

Consolidates multiple engineering application representations of engineering data;

Provides role-specific and application-specific views to the consolidated data model.

Allows data model changes without upsetting applications of the data

During engineering design of a plant, data describing the plant (i.e., equipment, materials, operating conditions, feedstocks, products, instrumentation to measure behavior of the plant, plant topology, etc.) are defined. Once the plant is built, the same data describe the existing plant. The present invention enables data (describing the plant) that are defined during engineering design to be:

Shared by all participants in the design work process, and

Transferred from design to plant operation and be used as a basis for computer programs that enable retrieval of information about the plant, as well as to monitor and optimize plant operation.

Similarly, the invention described herein enables plant data (equipment, materials, operating conditions, feedstock, product, instrumentation, plant topology) that are created during implementation of computer programs that monitor and optimize plant operation, to be:

Shared by all personnel in the plant, enterprise that owns the plant, or anyone authorized access to the data;

Transferred from plant operations to engineering design (computer programs) thereby ensuring that the same data that describe operation and equipment of the existing plant are used in redesign of the plant.

In addition, the invention described herein enables all data (e.g. equipment size parameters) and information (e.g. operating procedure or maintenance order) about a particular part of the enterprise (e.g. a specific plant or a pipeline connecting the plant to a terminal), or part of the plant (e.g. heat exchanger), or part of the equipment (e.g. tube in a heat exchanger) to be:

Viewed as it is most suitable for a particular job function, e.g. mechanical engineering will want to review size of the tubes in the heat exchangers, what material they are made of, etc., while a process engineer may want to view only the capacity of the heat exchanger.

Accessed directly regardless where it is stored in various computer systems.

To accomplish this, the present invention in a preferred embodiment provides (1) a three-tier object-oriented data model architecture for organizing the data and for enabling access to information; (2) data schemas for objects and quantities typical to chemical plant process engineering and operations; and (3) a software system for the definition and administration of the data model, and management and access of data objects and data.

In particular, computer method and apparatus of the present invention for managing and sharing engineering data for chemical or other engineering processes include a respective class view for each of multiple software applications of interest, a composite class view, and a core (conceptual) data model. The class views, composite class view and core data model are consolidated or otherwise combined to form a multi-tier data model with links between corresponding attributes across the tiers. The multi-tier data model enables (i) management of engineering data from the multiple software applications, and (ii) sharing or access to information (engineering data) in the multiple software applications by other process and plant engineering routines and programs. An amalgamator synthesizes the class views, composite class view and conceptual data model into the multi-tier data model. In forming the multi-tier data model, there is a one-to-one mapping between an attribute in the class view and that of the composite class view, and a one-to-one mapping between an attribute in the composite class view and a data path in the core data model to corresponding software applications from which the attribute originated. Preferably, there are links from the composite class view attributes to the application class views.

In accordance with one aspect of the present invention, each class view is preferably represented in terms from the respective given application such that an end user of said given application is able to access data from the core data model.

Further, in the preferred embodiment, at least one of the class views, composite class views and core data model are represented by object oriented programming elements. Certain object oriented programming elements are defined by classes. The invention apparatus further comprises a class library editing subsystem for enabling user creation and editing of definitions of the classes.

Preferably, the class library editing subsystem employs XML for interfacing with users.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 3a-3j are a set of tables illustrating a preferred embodiment of part of the conceptual data model (third tier) for a shell and tube heat exchanger equipment class used in the embodiment of FIG. 2.

FIGS. 4a-4y are a set of tables illustrating a preferred embodiment of the composite class view (second tier) for the shell and tube heat exchanger in the embodiment of FIG. 2.

FIG. 5 is a index of FIGS. 5a-5e.

FIGS. 5a-5e are a set of tables illustrating a preferred embodiment of two typical application class views (first tier) for shell and tube heat exchangers such as in the FIG. 2 embodiment.

DETAILED DESCRIPTION OF THE INVENTION

A description of preferred embodiments of the invention follows.

As described herein, the present invention is intended to be used as a part of the software architecture in a computer software system for managing engineering data and integrating engineering tools used in the design and operation of plants in the process industries (chemical, petrochemical, refining, pharmaceutical, polymers, plastics and other process industries).

A. Three-Tiered Data Model Architecture

Figure 1:
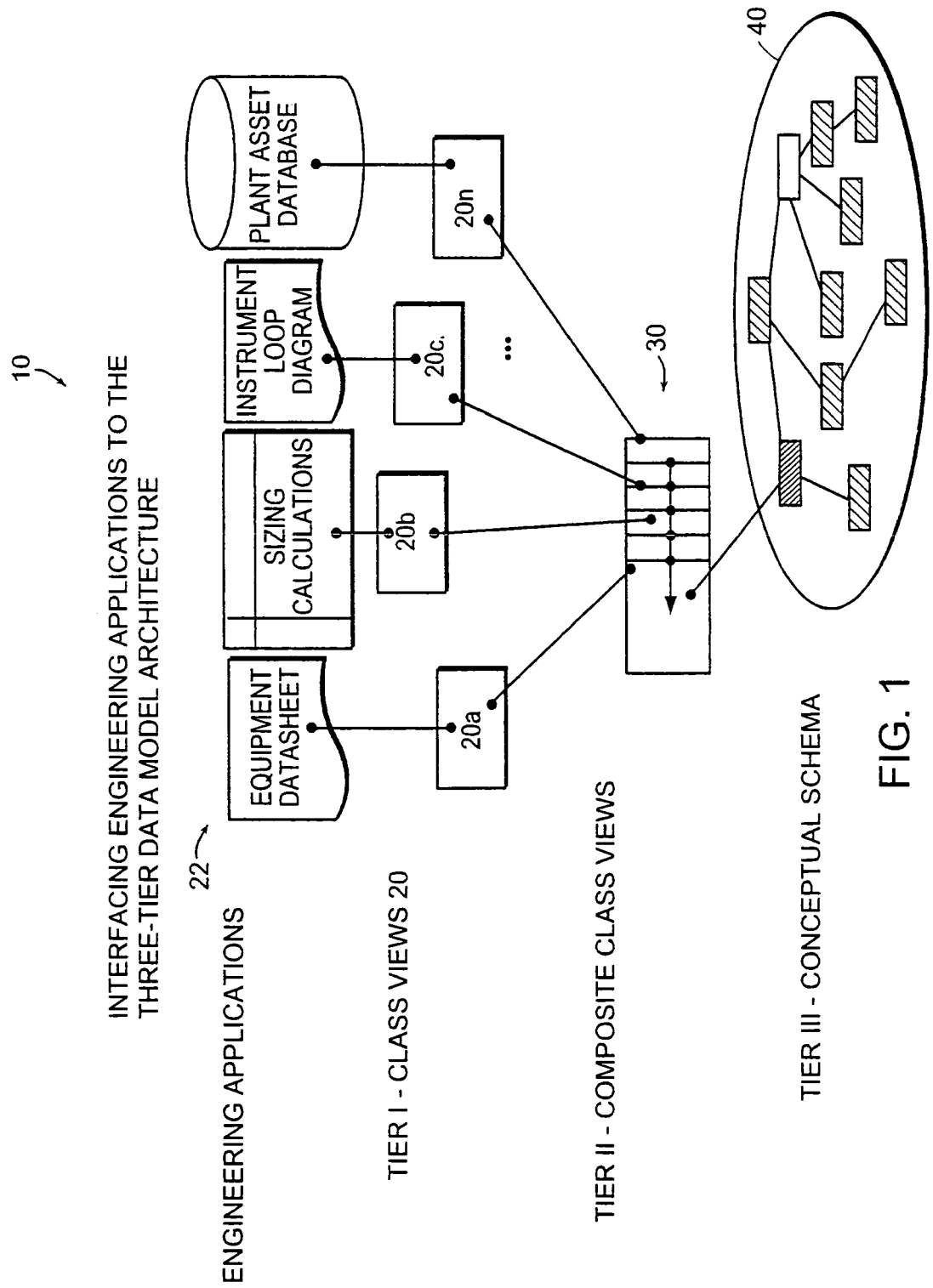
FIG. 1 is a schematic diagram illustrating the three-tier data model architecture of the present invention.

In one embodiment of the present invention, a data model architecture 10, as shown in the FIG. 1, is formed of three tiers:

(i) Class views 20 (Tier I);
(ii) Composite class views 30 (Tier II); and
(iii) Conceptual model 40 (Tier III).

A Class View 20 is an application view of the data, expressed in the language and terminology of the application 22 or application users. A Class View 20 comprises a formal representation of an individual application 22 data model.

The terminology, structure and content of the Class View 20 follows closely the application's 22 own data representation. The development of Class Views 20 fulfills two major purposes. They 20 provide important documents as input to the generation of the conceptual model 40. They 20 also provide the primary tool for mapping an application 22 to the conceptual model 40, in a manner insulating applications 22 from changes in the underlying conceptual model 40.

The synthesis (or consolidation) of the Class Views 20 results in the creation of a Composite Class View 30. In particular, the composite Class View 30 is an amalgamation and rationalization of the individual Class Views 20. The descriptions of the attributes in the Class Views 20 remain in application domain terminology.

The Composite Class View 30 is subsequently mapped to a core or conceptual model 40. The conceptual model 40 defines the worldview of the data model, using abstraction and normalization to build a model that is consistent, compact, and maximizes reuse of conceptual constructs.

In the construction of the Composite Class View 30 and the Class Views 20, Applicants aim for a one-to-one mapping between an attribute in the Composite Class View 30 and a route in the conceptual model 40 (i.e., the route being a linked list or other data path of the corresponding applications 22 from which the attribute originated).

As illustrated in FIG. 1, engineering applications 22 are interfaced or integrated into the invention three-tier data model architecture 10. Engineering applications 22 include, but are not limited to, equipment or other data sheets, sizing calculations, instrument loop diagrams, plant asset database programs/systems, etc. As described above, there is a need and desire for these engineering applications 22 to be accessed by users of various roles. However, each application 22 displays the sought after data with different views.

In the invention three-tier data model architecture 10, class views 20 provide the application specific views at Tier I of the model 10. One or more composite class views 30 at Tier II provide consolidated engineering views. Each consolidated view ensures data is shared correctly by related applications 22. At Tier III, the invention conceptual model 40 provides a highly normalized, application-independent data model.

B. Description of a Preferred Embodiment of the Three-Tier Data Model

Figure 2:
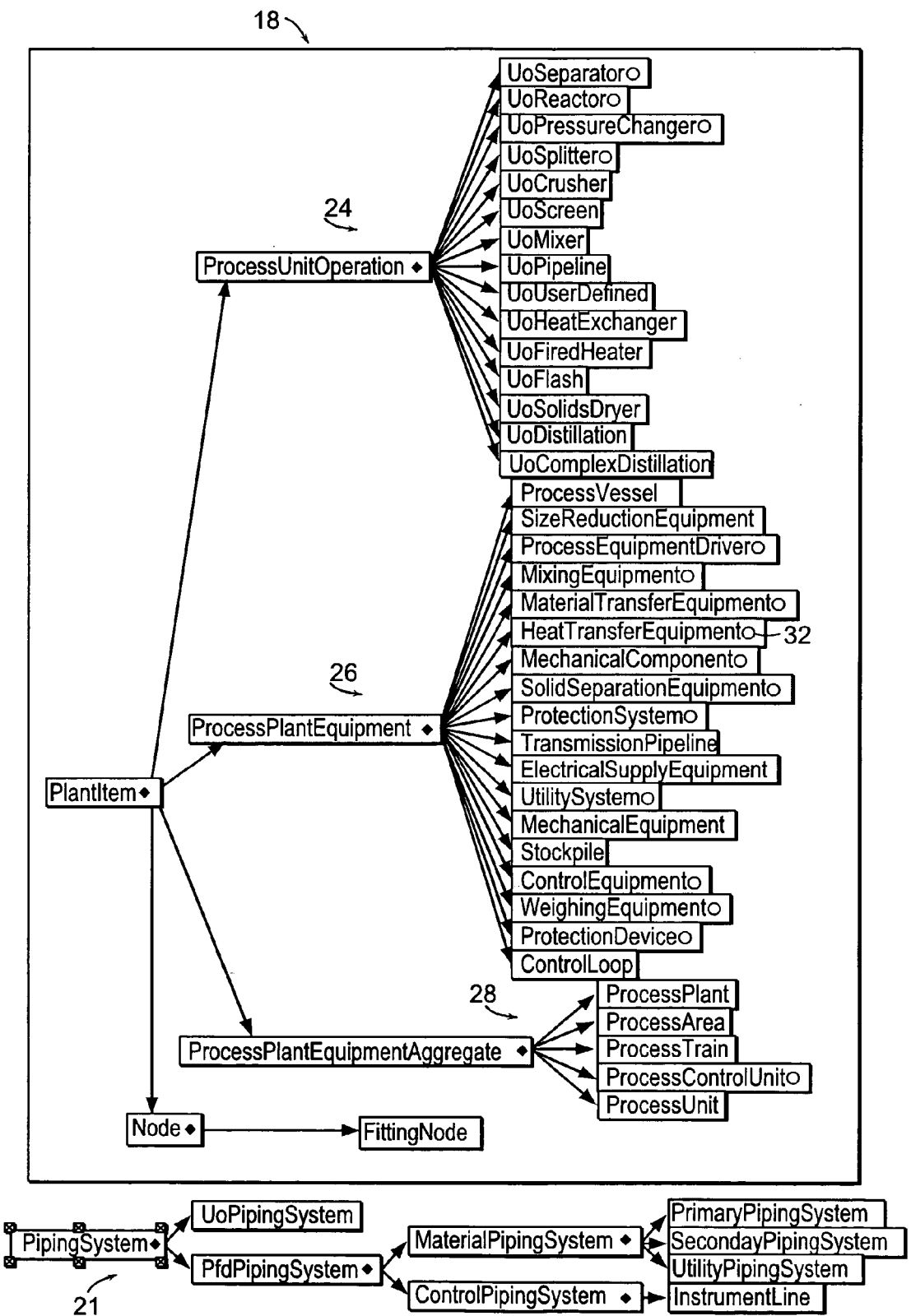
FIG. 2 is a diagram describing the invention conceptual object classes in an embodiment for process unit operation models, process streams, plant equipment, piping systems, and instrumentation.
Figure 3:
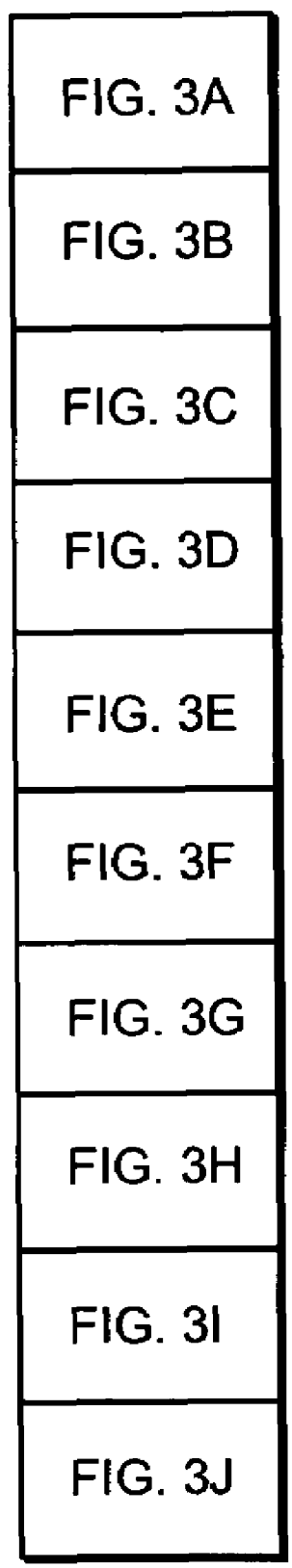
FIG. 3 is an index of FIGS. 3a-3j.

FIG. 2 gives a high-level view of the object classes for a preferred embodiment of a conceptual model 18 for process engineering. In particular, the process engineering conceptual model 18 includes representations of process unit operation models 24, plant equipment items 26, plant piping systems 21, and other plant equipment aggregate objects 28.

To further illustrate the model representation of equipment items 26, FIGS. 3a-3j, 4a-4y and 5a-5e present a preferred embodiment of the three-tier data schema for the specific equipment type called "Shell and Tube Heat Exchanger" 32. Beginning with the conceptual model 18 (Tier I), FIGS. 3a-3j provide a representation of the structure and attributes part of the model 18 for a shell and tube heat exchanger equipment class 32. The illustrated shell and tube heat exchanger class 32 defines attributes by name 42, representation type 44 (i.e., real number, character string, table, etc.), quantity type 46 (units or format of measurement, e.g. flow rate mass, flow rate volume, flow rate moles, percentage, temperature, pressure, concentration mole/mole, etc.) and a description 48. This representation is only part of the conceptual data model 18.

Figure 4:
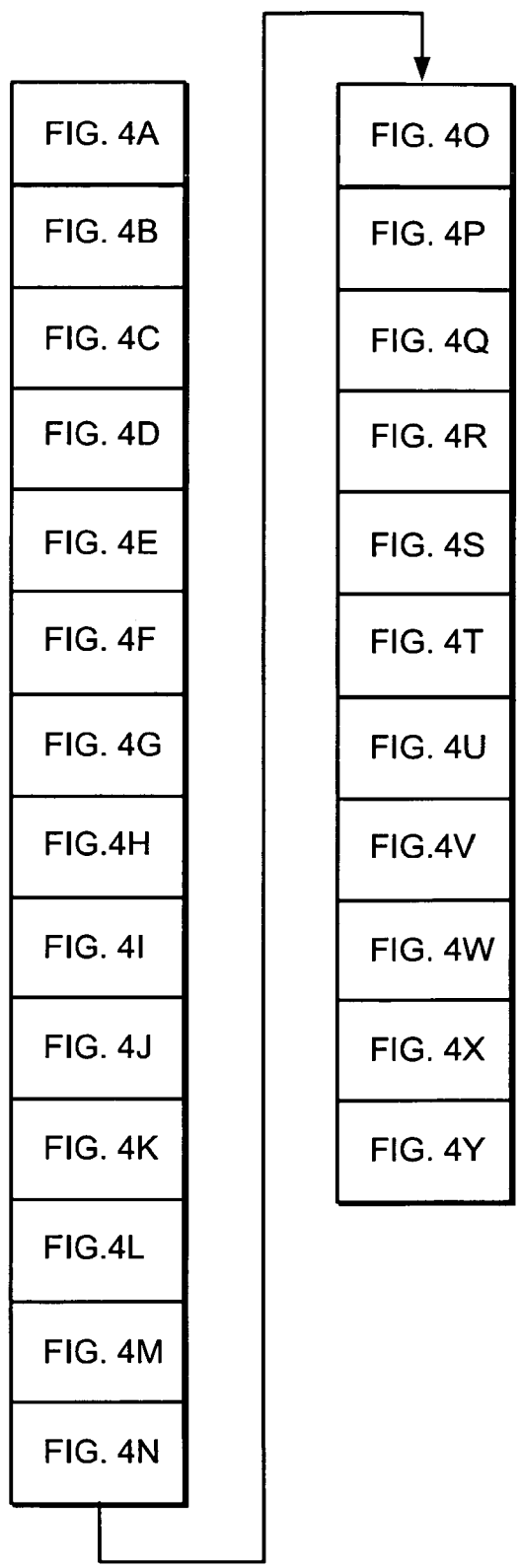
FIG. 4 is an index of FIGS. 4a-4y.

FIGS. 4a-4y illustrate a table 34 of the attributes for a composite view 30 for a shell and tube heat exchanger 32. The "Route" column 36 in the table lists the attribute mappings between the conceptual data model 18 (Tier III) and the composite class view (Tier II) attributes 34.

FIGS. 5a and 5b show a table 38 of some of the attributes for a specific application 22 class view 20 (Tier I), corresponding to that of a mechanical equipment data sheet view for a shell and tube exchanger 32. The "Link" column 39 in the table lists the attribute mappings between the composite class view (table 34 of FIGS. 4a-4y) and the application class view attributes 38.

Figure 5E:
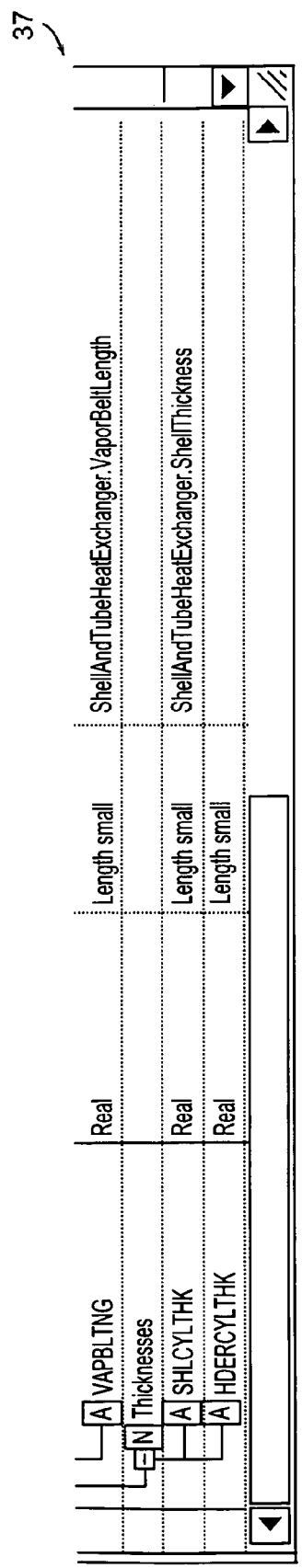

FIGS. 5c-5e show a table 37 of some of the attributes for an alternative application class view 20 (Tier I), corresponding to that of a thermal design calculation program 22 view for a shell and tube exchanger 32. The "Link" column 35 in the table lists the attribute mappings between the composite class view (table 34 of FIGS. 4a-4y) and this particular application class view attributes 37.

Arranging and relating the model 18 data in the foregoing manner according to the three-tier architecture 10 of the present invention provides certain advantages over the prior art as described above. These advantages will become clearer in the following discussion of management and use of the invention model representations.

Description of a Class Library Editor System

Figure 6:
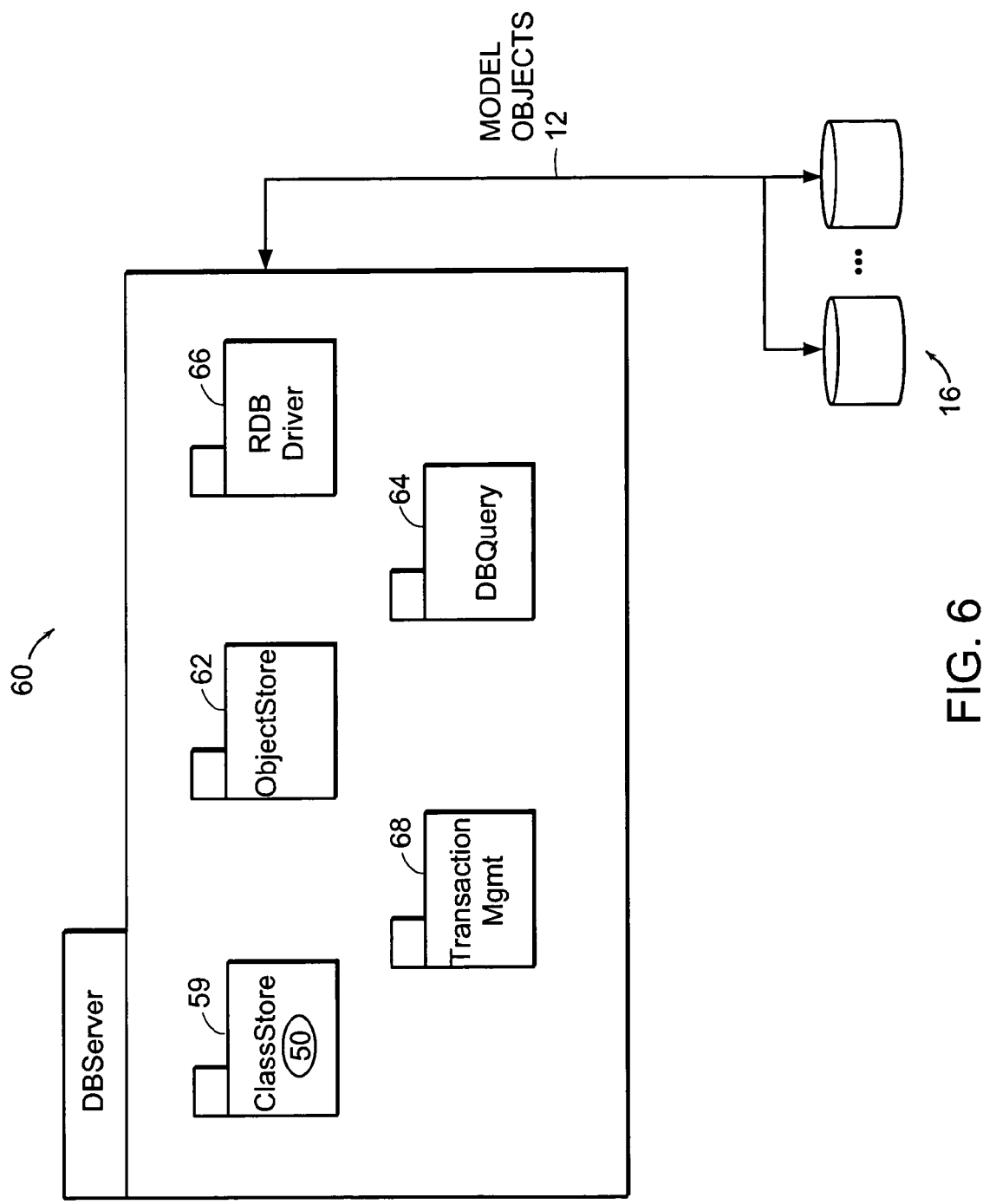
FIG. 6. is a block diagram of a data server system embodying the present invention.
Figure 7:
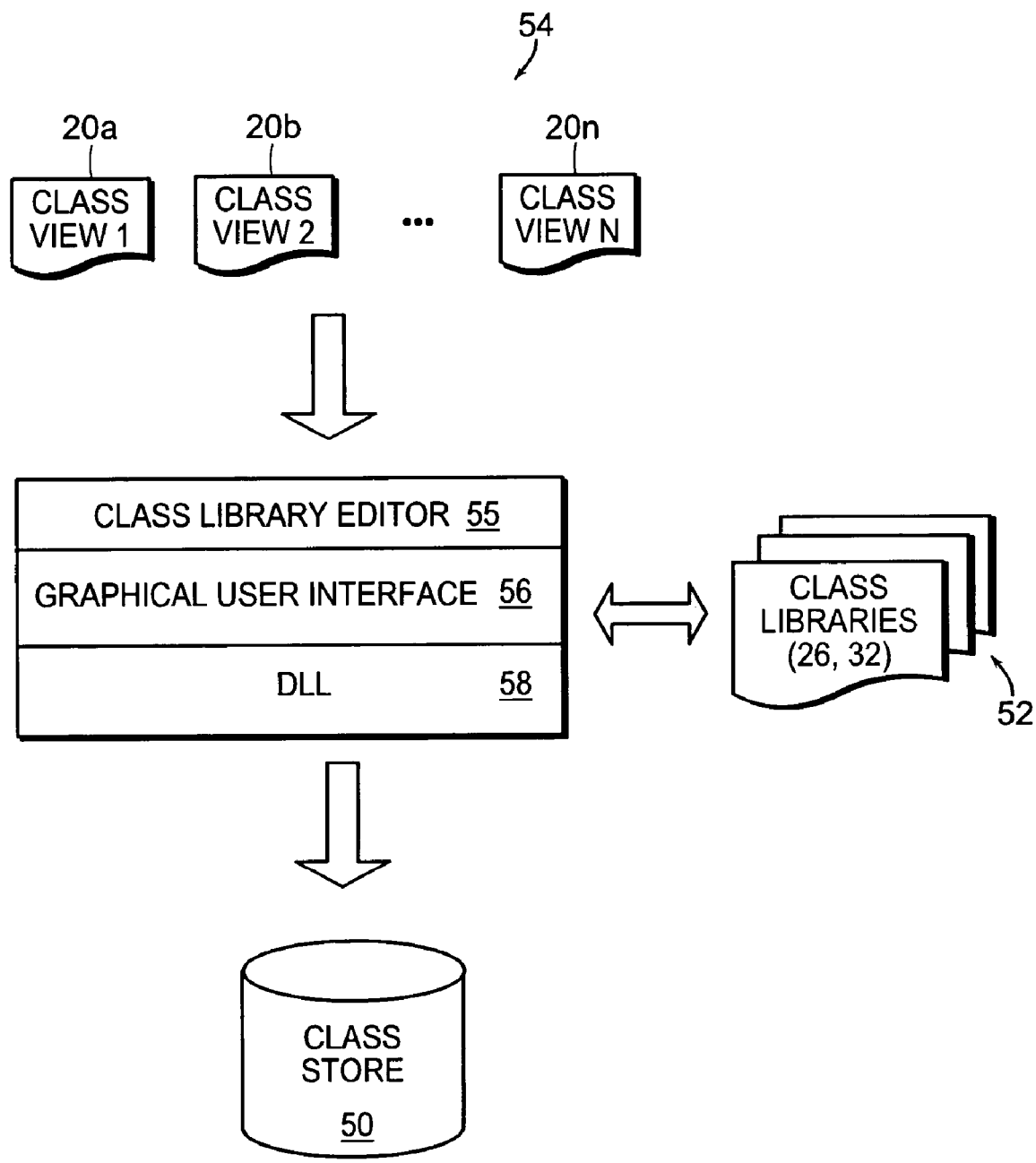
FIG. 7 is a block diagram of a class library editor system of the present invention.

In a preferred embodiment, the model representations (i.e., representations of the conceptual model 40 and various class views 30, 20) are implemented by objects in an object oriented programming language. Each object is defined by a class. Referring to FIG. 7, a Class Library Editor system 54 of the present invention supports the creation and editing of Class Libraries 52 and the compilation of these class libraries into a Class Store 50. The Class Store 50 is used in the data management system 60 (FIG. 6) of the present invention discussed later. A Class Library 52 comprises a named collection of related class and association definitions (organized according to an XML Schema). Typically, the set of definitions contained in each class library 52 are related by a common purpose, e.g. a class library 52 may contain classes for mechanical parts for rotating equipment, or classes of heat transfer equipment 26, 32.

The Class Store 50 is a 'compiled' version of the Class Library 52. It contains a 'flattened' (not hierarchical) representation of the classes in the Library 52 and its referenced libraries, with all dependencies checked and properly mapped.

The Class Library Editor system 54 supports multiple class libraries 52, and a class library may reference other class libraries to allow relationships between classes in different class libraries.

In the preferred embodiment of the Class Library Editor system 54 there is a class library editor 55. This editor 55 is formed of two subsystems, namely a user interface 56 and dynamic link library 58. The user interface 56

(i) Supports the interactive creation and editing of data model libraries 52.

(ii) Allows the data modeler to define and edit the class views 20, composite views 30 and classes and supporting data model constructs.

(iii) Creates links between the attributes of an application class view 20 and the attributes in the composite view 30.

(iv) Creates routes between attributes in the composite view 30 and the attributes in the conceptual model 40.

(v) Checks the consistency of the definitions across the three tiers of the model 40.

(vi) Shows the usage of attributes in one tier by attributes in the tiers above.

(vii) Generates the Class Store 50 from multiple class libraries 52.

The dynamic link library 58 provides the underlying basic operations on the data model 40 such as insertion, deletion, renaming, and modifying the properties of data model constructs. The dynamic link library 58 also provides an automation interface to the data model 40 so that a data model can be manipulated programmatically as well as through the GUI 56.

Users can start developing the (Tier III) data model 40 at any of the three tiers I-III with views 20, 30, 40 (FIG. 1). For example, they can start by defining a particular application class view 20. They can then progress to linking the data representations from that view 20 to data representations in a new or existing composite view 30. Finally they can define new or reuse existing classes to describe the conceptual model 40.

Alternatively users can create an application independent composite view 30 in the second tier, and later create class views 20 which link to this composite view 30. The links between the three tiers in the data model 40 are preferably carried out (i.e., defined) by "drag and drop" operations in the user interface 56. Other user selection and/or command techniques are suitable.

D. Description of a Data Server System

Using the Class Store 50 generated by the Class Library editor 55, a data server system 60 instantiates and manages objects and their underlying data. The data server system 60 also manages access of the objects and data by external programs. A preferred embodiment of a data server system 60 of the present invention is shown in FIG. 6 and is described next.

The data server system 60 implements Object Models 12 (programming objects representing parts of given conceptual models 40 and corresponding composite class views 30 and application class views 20) including persisting and restoring them from a database management system 16 such as a RDB (relation data base management system). The data server system 60 provides session management for applications 22 connecting to a workspace. The data server system 60 implements access control checks as determined by end user's roles. The data server 60 implements automation API (application program interface) for use by application data services and programming scripts.

Subsystem Class Store 59

The class store subsystem 59 includes the C++ classes that provide the definitions for classes, attribute definitions and any other definition related information.

Subsystem Object Store 62

The object store sub-system 62 covers the classes required to implement objects 12, attributes, cases and any other instance related information.

Subsystem DBQuery 64

The query module (DBQuery) 64 defines the automation API's to other external systems. It is through these API's that both application data services and KB scripts can interface to the other subsystems 59, 62, 64, 66, and 68.

Subsystem RDB Driver 66

This subsystem 66 manages the communication between the Object Store 62 and the relational database(s) 16. In one embodiment, a generic OLEDB implementation is employed. However, the system is architected such that drivers for specific types of relational databases may be incorporated (e.g. a dedicated ORACLE® software driver using native ORACLE® API's).

Subsystem Transaction Management 68

The transaction manager/subsystem 68 addresses transaction management issues of the system 60. This includes maintaining a request queue and a thread pool that reads from the request queue. The transaction manager 68 also optimizes transaction locking and detects transaction deadlocking using various known techniques.

Figure 8:
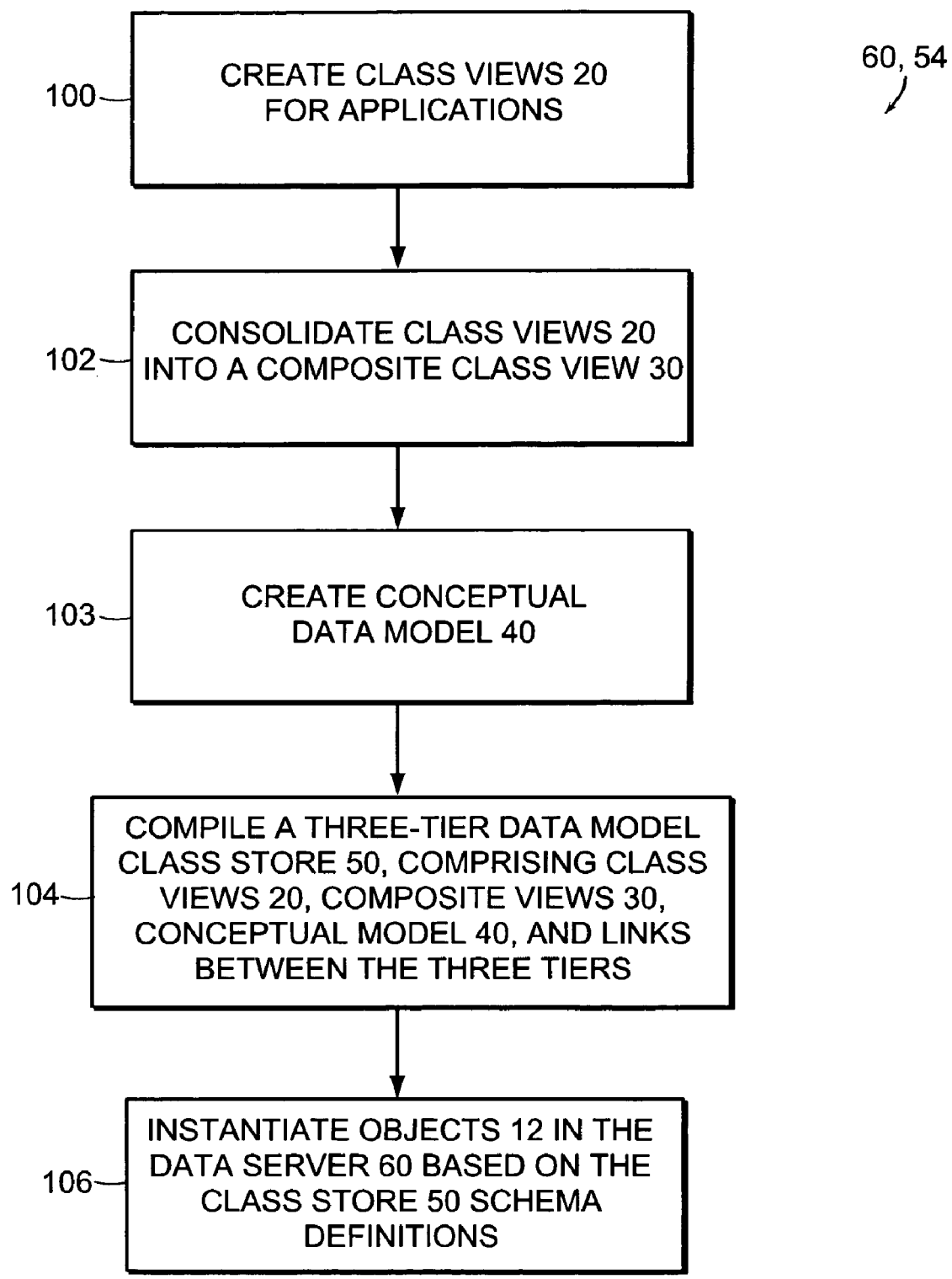
FIG. 8 is a flow diagram of the class library editor and data server systems of FIGS. 6 and 7.

The combination of the class library editor system 54 and the data server system 60 thus provides a method of creating and using data models as illustrated in FIG. 8. Given are one or more software applications that model processes of interest (e.g., chemical engineering processes). Each software application has or follows a respective data model. For each such application, the class library editor system 54 provides (step 100) a practitioner's (end user of the application) view of the application using a class view 20 of the application data model.

Next (step 102) the class library editor system 54 consolidates the class views 20 into a composite class view 30.

Next (step 103) the class library editor 55 generates new or edits existing class structures and attributes of classes comprising the conceptual data model 40. The class library editor system 54 then creates a class store 50 (step 104) for the three tier data model. The class store 50 comprises class attributes and structures of class views 20, composite class views 30 and core conceptual model 40 with accompanying attribute links between the tiers.

A class store 50 results from step 104 having been accomplished. In turn (step 106), data server system 60 uses class store 50 to instantiate data objects 12 and expose these objects 12 through interfaces following the class and other views 20, 30, 40. The combined systems 54, 60 enable sharing of original application data (e.g., engineering data) with other process and plant engineering routines, programs and the like. As such the invention enhances process engineering as heretofore unachieved by the prior art.

While this invention has been particularly shown and described with references to preferred embodiments thereof, it will be understood by those skilled in the art that various changes in form and details may be made therein without departing from the scope of the invention encompassed by the appended claims.

For example, the use of chemical engineering processes is by way of illustration and not limitation of the data modeling and management applications to which the present invention is directed. Modeling of refining, pharmaceutical, polymer processing and other engineering processing are contemplated/included.

Amalgamation and rationalization at the composite class view 30 stage (Tier II) of the present invention is by known techniques. Similarly, abstraction and normalization at the conceptual model 40 (Tier III) is by known techniques. A variety of techniques or combinations thereof are suitable in forming the composite class view 30 and conceptual/core model 40, given the foregoing description of the invention and preferred embodiments.

Further, one or more databases 16 on one or a network of computer systems may be employed. Data server system 60 may be software or a mixture of hardware and software executed on a digital processor or suitable computer system (stand alone, local area networked, wide area networked and the like). Various computer configurations are suitable and within the purview of one skilled in the art.

Although the preferred embodiment is described with three tiers, it is understood that other multiple numbers of tiers are within the purview of one skilled in the art given the above description of the present invention. The effect of the described three tiers may be implemented by any number of tiers or one partitioned tier and the like.

What is claimed is:

1. A computer apparatus for managing and sharing engineering data for chemical engineering processes and plants, comprising:
    a digital processor;
    an editor defining (i) class views and (ii) a composite class view of the defined class views, given one or more software applications of interest and each given software application having a respective data model or data view, for each said given software application, the editor providing a class view of the respective data model;
    the editor consolidating said class views to form a composite class views, the consolidating of said class views resulting in the creation of said composite class view being an amalgamation and a rationalization of the individual class views, and the class views being retained in a given software application domain terminology for managing and sharing engineering data for chemical engineering processes and plants; and
    a data server executed by the digital processor and instantiating a multi-tier data model, there being a core conceptual data model having a plurality of routes between attributes in the composite class view and attributes in the core conceptual data model; the class views effectively being one tier of the multi-tier data model, the composite class view effectively being a second tier of the multi-tier data model and the core conceptual data model effectively being a third tier, the multi-tier data model having links between corresponding attributes across tiers, the multi-tier data model providing management and sharing of engineering data of the given software applications with other process and plant engineering applications, and enhancing process engineering and plant operations.

2. The computer apparatus as claimed in claim 1 further comprising an amalgamator that synthesizing the class views, composite class views and the core conceptual data model into a consolidated multi-tier data model.

3. The computer apparatus as claimed in claim 1 further comprising a mapper that links the core conceptual data model attributes to the composite class view and the composite class view attributes to class views, and provides a one-to-one mapping between an attribute in the composite class view and a route in the core conceptual data model to corresponding given software applications from which the attribute in the composite class view originated.

4. The computer apparatus as claimed in claim 3 wherein each class view is represented in terms from the respective given software application, and said given software application is able to access data from the core conceptual data model.

5. The computer apparatus as claimed in claim 1 wherein the class views, composite class views and the core conceptual data model are represented by object oriented programming elements.

6. The computer apparatus as claimed in claim 5 wherein certain object oriented programming elements are defined by classes; and wherein
    the editor enables user creation and editing of definitions of classes.

7. The computer apparatus as claimed in claim 6 wherein the editor employs an Extensible Markup Language.

8. A method of data modeling, comprising the computer implemented steps of:
    (a) forming a multi-tier data model with links between corresponding attributes across tiers, a first tier being formed by:
        for each of multiple given software applications of interest and having a respective data model, providing a practitioner's view of the given software application using a respective class view of the respective data model;
        a second tier being formed by consolidating class views into a composite class view, the consolidation of said class views resulting in the creation of said composite class view being an amalgamation and a rationalization of the individual class views, and the class views being retained in a given software application domain terminology for managing and sharing engineering data for chemical engineering processes and plants; and
        a third tier being formed by forming a core conceptual data model having a plurality of routes between attributes in the composite class view and attributes in the core conceptual data model; and
    (b) sharing, via the multi-tier data model, engineering data of the given software applications with other process and plant engineering routines, and enhancing process engineering and plant operations.

9. The method as claimed in claim 8 wherein the second tier is formed by synthesizing the class views into the composite class view.

10. The method as claimed in claim 8 wherein the step of forming a multi-tier data model further comprises producing a one-to-one mapping between an attribute in each class view to the composite class view, and a one-to-one mapping between an attribute in the composite class view and a route in the core conceptual data model to corresponding given software applications from which the attribute originated in the composite class view originated.

11. The method as claimed in claim 8 wherein the step of providing a practitioner's view includes, in each class view, representing the respective data model in terms from the respective given software application.

12. The method as claimed in claim 8 further comprising the step of representing at least one of the class views, the composite class view and the core conceptual data model in terms of object oriented programming elements.

13. The method as claimed in claim 12 wherein certain object oriented programming elements are defined by classes; and
    enabling user creation and edition of definitions of classes.

14. The method as claimed in claim 13 wherein the step of enabling user creation and edition includes employing Extensive Markup Language interfaces.

15. A computer program product comprising:
    (a) a computer readable medium that manages engineering data; and
    (b) a set of computer program instructions encoded on the computer readable medium, the set of computer program instructions when executed on a computer causing the computer to:
    provide a respective class view for each of plural given software applications of interest and having a respective data model, each class view being of the respective data model;

form a composite class view from the class views, the consolidation of said class views resulting in the creation of said composite class view being an amalgamation and a rationalization of the individual class views, and the class views being retained in a given software application domain terminology for managing and sharing engineering data for chemical engineering processes and plants;

form a conceptual model having a plurality of routes between attributes in the composite class view and attributes in the conceptual model;

form a consolidated multi-tier data model from the class views, the composite class view and the conceptual model, the class views effectively being one tier of the consolidated multi-tier data model, the composite class view effectively being a second tier of the consolidated multi-tier data model and the conceptual model effectively being a third tier, the consolidated multi-tier data model having links between corresponding attributes across tiers; and via, the consolidated multi-tier data model, provide sharing of engineering data of the given software applications with other process and plant engineering applications, and enhancing process engineering and plant operations.

16. The computer program product of claim 15, wherein the consolidated multi-tier data model insulates the given software applications from changes in the conceptual model.

17. The computer program product of claim 15, wherein the consolidated multi-tier data model is insulated from changes in the given software applications.

18. The computer program product of claim 15, wherein the consolidated multi-tier data model provides an application independent and normalized data model where the composite class view is application independent.

19. The computer program product of claim 15, wherein the consolidated multi-tier data model comprises an editor and a class store, the class store providing an interface to the respective class views, the composite class view, and the conceptual model to share data between the consolidated multi-tier data model and the given software applications.

20. The computer program product of claim 19, wherein the editor and the class store use an Extensible Markup Language, and wherein the composite class view provides for the class views remaining in the given software application domain terminology.

* * * * *

UNITED STATES PATENT AND TRADEMARK OFFICE
CERTIFICATE OF CORRECTION

PATENT NO. : 7,367,018 B2 Page 1 of 1
APPLICATION NO. : 10/692006
DATED : April 29, 2008
INVENTOR(S) : Robert G. Noble et al.

It is certified that error appears in the above-identified patent and that said Letters Patent is hereby corrected as shown below:

Column 10, Claim 10, line 39, delete "originated".

Signed and Sealed this

Twenty-second Day of July, 2008

JON W. DUDAS
*Director of the United States Patent and Trademark Office*